(12) United States Patent
Coppenrath

(10) Patent No.: US 12,280,643 B1
(45) Date of Patent: Apr. 22, 2025

(54) TRUCK RACK AND TOPPER SYSTEM

(71) Applicant: Tracktops Limited Liability Company, Houston, TX (US)

(72) Inventor: Skyler Wilhelm Coppenrath, Houston, TX (US)

(73) Assignee: TRACKTOPS LIMITED LIABILITY COMPANY, Houston, TX (US)

( * ) Notice: Subject to any disclaimer, the term of this patent is extended or adjusted under 35 U.S.C. 154(b) by 0 days.

(21) Appl. No.: 18/666,913

(22) Filed: May 17, 2024

(51) Int. Cl.
*B60J 7/10* (2006.01)

(52) U.S. Cl.
CPC ..................................... *B60J 7/104* (2013.01)

(58) Field of Classification Search
CPC . B60J 7/104; B60J 7/106; B60J 7/0007; B60J 7/1858; B60J 7/1291; B60J 7/085; B60J 7/102; B60J 5/08; B60J 5/0487; B62D 27/04; B62D 25/06; B62D 33/062; B62D 33/0207; B62D 33/044; B60R 21/13; B60R 9/058; B60P 7/06; B60P 3/40
USPC .............. 296/210, 214, 37.7, 71, 180.2, 1.7, 296/216.07, 102; 224/315
See application file for complete search history.

(56) References Cited

U.S. PATENT DOCUMENTS

| | | | | |
|---|---|---|---|---|
| 3,566,561 | A * | 3/1971 | Tozer | F16B 12/50 |
| | | | | D25/123 |
| 4,738,274 | A * | 4/1988 | Heath | B60P 7/02 |
| | | | | 296/156 |
| 6,439,646 | B1 * | 8/2002 | Cornelius | B60J 7/102 |
| | | | | 296/105 |
| 6,971,563 | B2 * | 12/2005 | Levi | B60R 9/0423 |
| | | | | 224/403 |
| 8,322,582 | B2 * | 12/2012 | Flaherty | B60R 9/00 |
| | | | | 224/403 |
| 9,321,493 | B2 * | 4/2016 | Dost | B60R 9/065 |
| 9,440,520 | B2 * | 9/2016 | Rohr | B60R 9/06 |
| 10,040,485 | B1 * | 8/2018 | Stojkovic | B62D 25/07 |
| 11,376,932 | B2 * | 7/2022 | Barnwell | B60J 10/90 |
| 11,548,446 | B2 * | 1/2023 | Ni | B60R 9/058 |
| 11,865,906 | B2 * | 1/2024 | Scammell | B60R 9/06 |
| 11,987,295 | B2 * | 5/2024 | Reyes | B62D 33/0207 |
| 2017/0166105 | A1 * | 6/2017 | Puchkoff | B60R 9/06 |
| 2017/0174270 | A1 * | 6/2017 | Leitner | B60R 9/00 |
| 2023/0286444 | A1 * | 9/2023 | Kuschmeader | B60R 9/00 |
| 2024/0010135 | A1 * | 1/2024 | Elder | B60R 9/06 |
| 2024/0083517 | A1 * | 3/2024 | Leitner | B60R 11/06 |
| 2024/0246617 | A1 * | 7/2024 | O'Rourke | B62D 33/0207 |

* cited by examiner

*Primary Examiner* — Amy R Weisberg
*Assistant Examiner* — Veronica M Shull
(74) *Attorney, Agent, or Firm* — Jeffrey L. Streets

(57) ABSTRACT

A rack for a truck bed includes a structural framework formed by a set of linear rails and a set of couplings. Each linear rail has a first end connected to one of the couplings and a second end connected to another of the couplings, wherein the rails and the couplings are connected to form a driver side frame, a front frame, a passenger side frame, a rear frame and a top frame. Each rail has a uniform cross-sectional profile including an outer profile that forms an outwardly directed T-slot and a central tube having an interior profile that is a complex shape. Each coupling includes a rigid body and a plurality of linear connectors extending from the rigid body, wherein each linear connector has an exterior profile that is a complement to the interior profile of the rail to which the connector is connected.

31 Claims, 26 Drawing Sheets

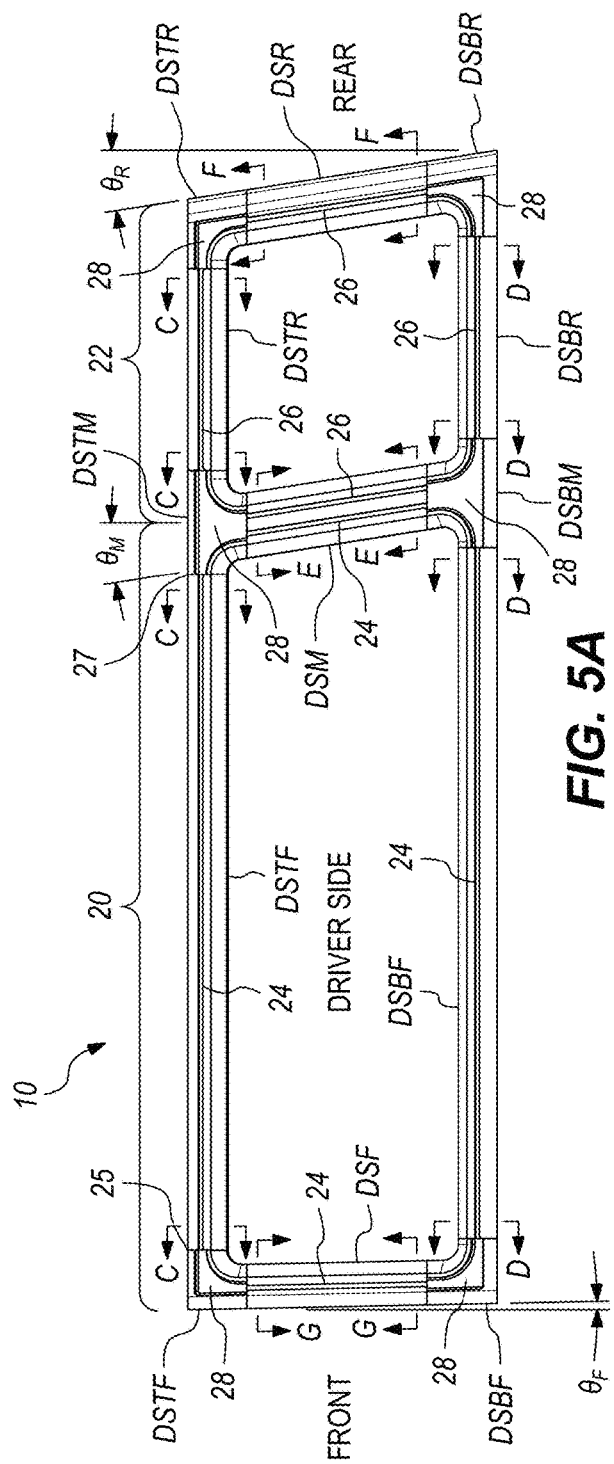
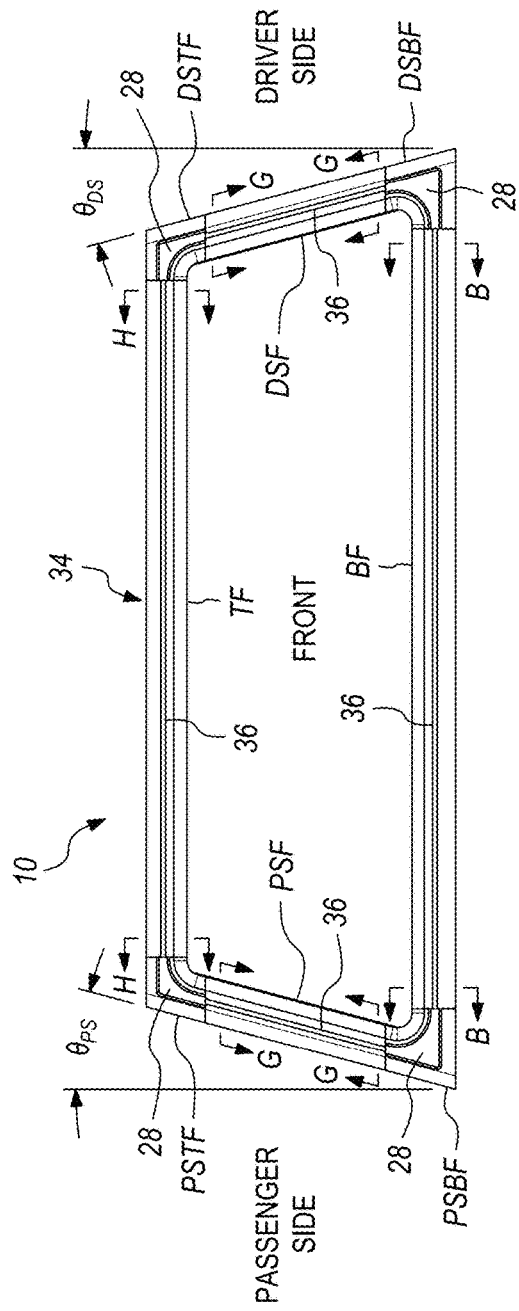
FIG. 5A
FIG. 5B

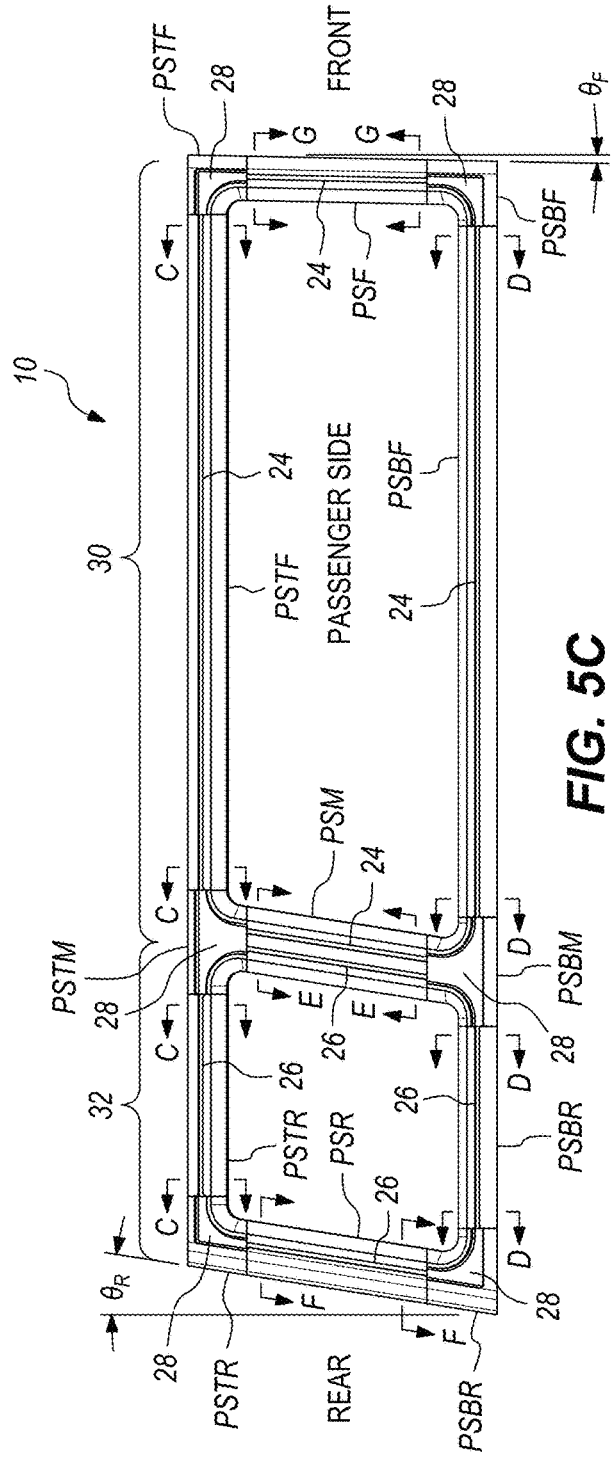
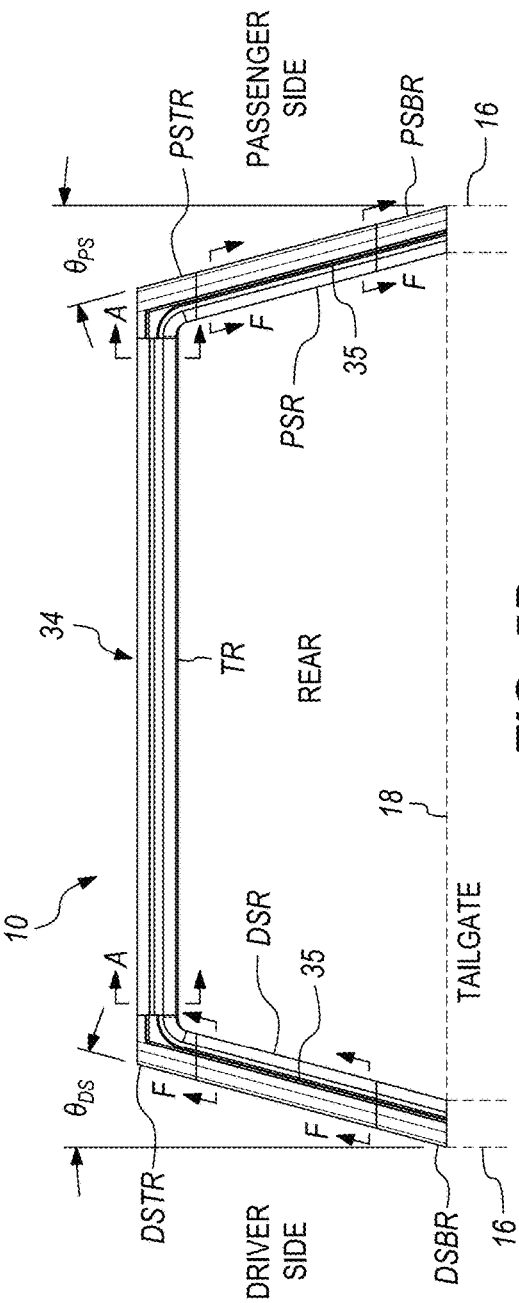
FIG. 5C
FIG. 5D

Profile A - Top Rear (*TR*)

Profile B - Bottom Front (*BF*)

Profile C - Top Sides (*DSTF, DSTR, PSTF, PSTR*)

Profile D - Bottom Sides (*DSBF, DSBR, PSBF, PSBR*)

Profile E - Vertical Middle (DSM, PSM)

Profile F - Vertical Rear (DSR, PSR)

Profile G - Vertical Front (*DSF, PSF*)

Profile H - Top Front (*TF*)

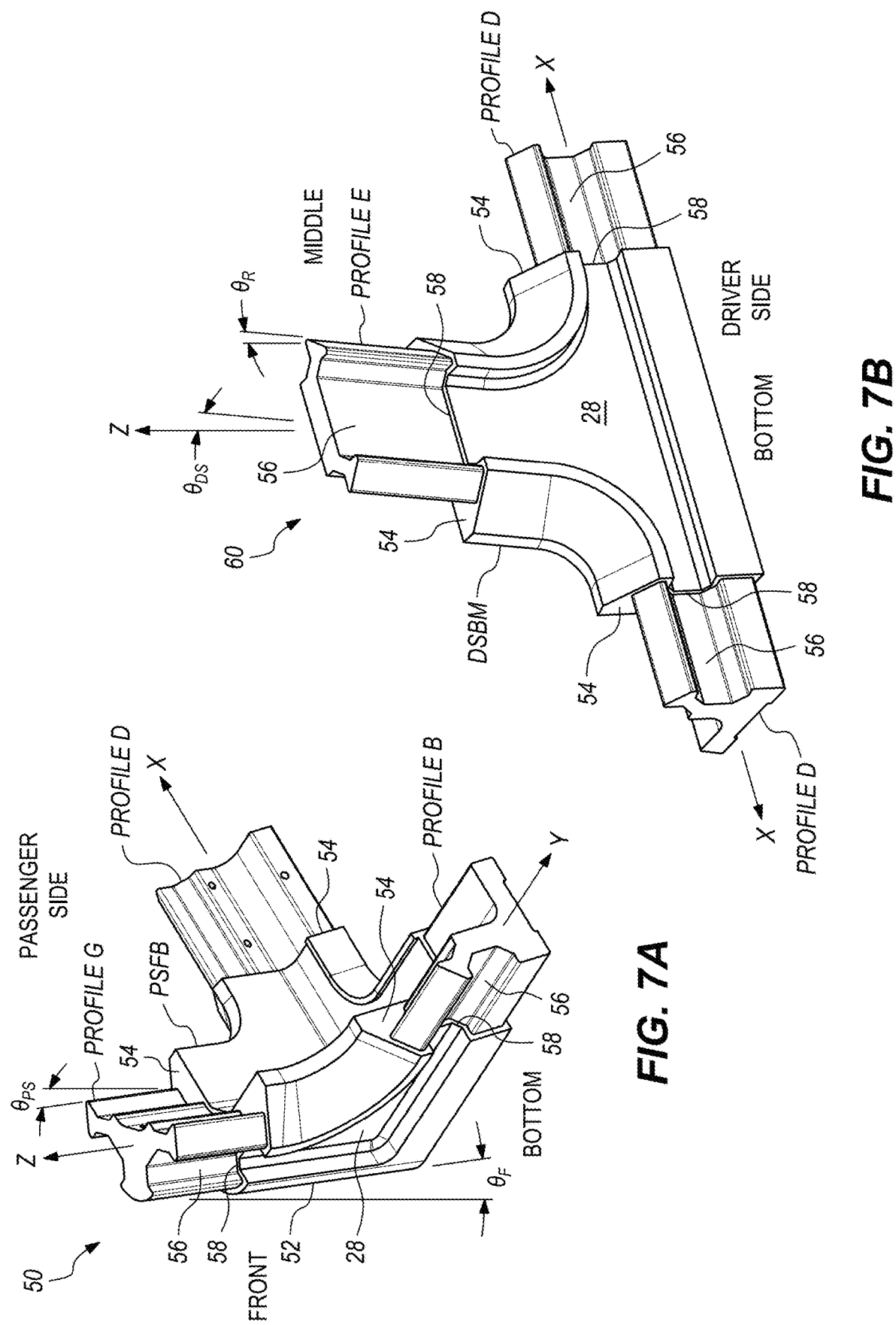

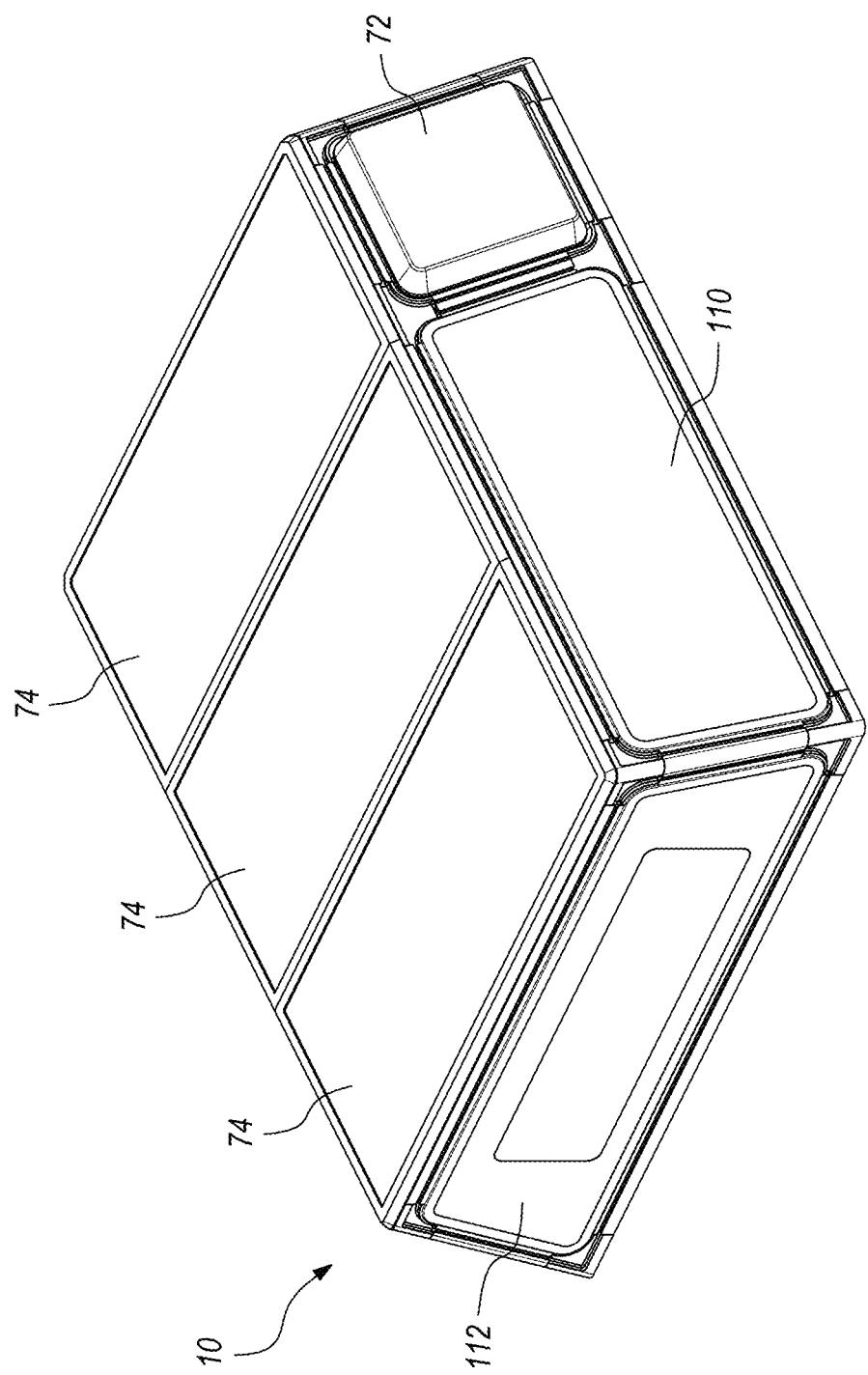

TRUCK RACK AND TOPPER SYSTEM

BACKGROUND

The present disclosure relates to a rack for providing a truck with storage.

BACKGROUND OF THE RELATED ART

A pickup truck, or simply "pickup", is a light or medium duty truck having an enclosed cabin and an open bed behind the cabin. The bed may be a flatbed with no side walls or a cargo bed with three low walls, a tailgate and no roof. The bed makes the pickup particularly convenient for hauling tools, workpieces or other personal items with convenient access for both loading and unloading.

While the pickup bed provides a sizeable area for storage, the stored items are often set on the bed. As more items are to be stored, the items may be set side by side or stacked. However, a large number of items stored in this manner may be difficult to access when needed. Accordingly, a pickup truck owner may install a truck rack in or on the truck bed, including a truck rack that is secured to a flatbed or the low walls of a cargo bed. Such a truck rack may be used to store a greater number of items or to separate and organize items to improve access. For example, a ladder that is large enough to occupy much of the cargo bed may be secured in a raised position on the top or sides of a truck rack to leave the cargo bed for other items.

Sometimes, it may be desirable to protect the items stored or carried in a pickup truck bed from environmental conditions, theft or public viewing. For example, some items may become damaged or lost if exposed to rain and/or wind, such that it may be desirable to have a weather resistant covering. To avoid theft, it may be desirable to have an enclosure that can be locked and unlocked as necessary. Furthermore, if the items are unsightly or private, then it may be desirable to reduce or prevent visibility of the stored items to onlookers. For many of these purposes, a truck cap, truck topper or other type of cover may be secured to the pickup truck bed.

Both a truck rack and a truck cap must be secured to the pickup truck bed so that it will withstand various conditions and remain in place. Specifically, a truck rack or truck cap must be securely connected to the pickup truck bed so that it is not dislodged during high winds and/or highway driving speeds, unintentional forces while loading or unloading items, or the shifting of stored items as the pickup truck changes driving directions or hits road bumps. As a result of the size and weight of these devices, as well as the fastening/unfastening and storage requirements of these devices, most pickup truck owners will not remove or replace their truck rack or truck cap very often, if ever.

BRIEF SUMMARY

Some embodiments provide a rack for a truck bed. The rack comprises a structural framework formed by a set of linear rails and a set of couplings. Each linear rail has a first end connected to one of the couplings and a second end connected to another of the couplings, wherein the linear rails and the couplings are connected to form a driver side frame, a front frame, a passenger side frame, a rear frame and a top frame. Each linear rail has a uniform cross-sectional profile along its length, wherein the uniform cross-sectional profile has an outer profile that forms an outwardly directed T-slot and a central tube having an interior profile that is a complex shape. Furthermore, each coupling includes a rigid body and a plurality of linear connectors extending from the rigid body. For each of the linear connectors, the linear connector has an exterior profile that is a complement to, and received within, the interior profile of the linear rail to which the linear connector is connected, wherein the central tube circumscribes the exterior profile of the connector.

Some embodiments provide a kit for forming a rack. The kit comprises a set of linear rails, wherein each linear rail has a uniform cross-sectional profile along its length, wherein the uniform cross-sectional profile has an outer profile that forms an outwardly directed T-slot and a central tube having an interior profile that is a complex shape. The kit further comprises a set of couplings, wherein each coupling includes a rigid body and a plurality of linear connectors extending from the rigid body. For each of the linear connectors, the linear connector has an exterior profile that is a complement to and receivable within the interior profile of one of the linear rails to which the linear connector is to be connected, such that the central tube circumscribes the exterior profile of the linear connector when the linear connector is inserted into the central tube. The set of linear rails and the set of couplings are adapted to form a structural framework in which each linear rail has a first end connectable to one of the couplings and a second end connectable to another of the couplings and wherein the linear rails and the couplings are connectable to form a driver side frame, a front frame, a passenger side frame, a rear frame and a top frame.

BRIEF DESCRIPTION OF THE SEVERAL VIEWS OF THE DRAWINGS

FIGS. 5A-D are plan views of the rack as seen from the driver side, front, passenger side and rear, respectively.

FIGS. 7A-B are perspective views of a corner coupling and an in-line coupling, respectively.

FIGS. 11A-B are perspective views of window panels, roof panels and a rear door/hatch before and after securing to the rack.

DETAILED DESCRIPTION

Figure 1:
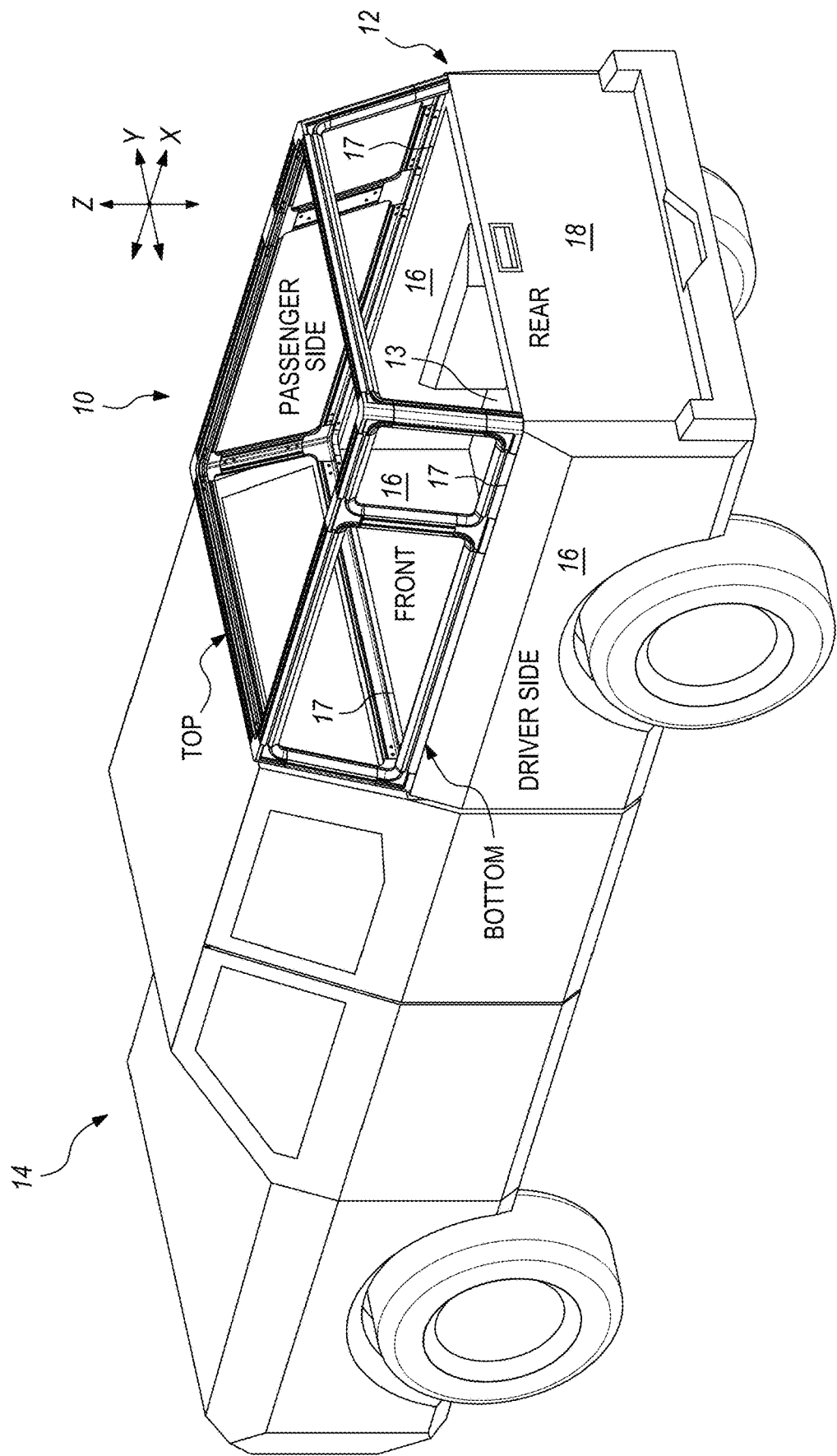
FIG. 1 is a perspective view of a rack secured to a truck bed according to some embodiments.

Some embodiments provide a rack for a truck bed. The rack comprises a structural framework formed by a set of linear rails and a set of couplings. Each linear rail has a first end connected to one of the couplings and a second end connected to another of the couplings, wherein the linear rails and the couplings are connected to form a driver side frame, a front frame, a passenger side frame, a rear frame and a top frame. Each linear rail has a uniform cross-sectional profile along its length, wherein the uniform cross-sectional profile has an outer profile that forms an outwardly directed T-slot and a central tube having an interior profile that is a complex shape. Furthermore, each coupling includes a rigid body and a plurality of linear connectors extending from the rigid body. For each of the linear connectors, the linear connector has an exterior profile that is a complement to, and received within, the interior profile of the linear rail to which the linear connector is connected, wherein the central tube circumscribes the exterior profile of the linear connector.

Some embodiments of the rack may be configured as an open truck rack or may be configured with various accessories to serve as a truck cap or truck topper. It is a technical benefit of some embodiments that the rack may be secured to a truck bed, while accommodating accessories that may provide additional function or capacity as a truck rack or accessories that may convert the truck rack into a truck cap. Furthermore, accessories used to form the truck cap may be removed to regain the truck rack functionality. Specifically, a truck rack is generally an open air structure that increases cargo space and/or gear mounting capabilities. A truck cap is secured to a truck bed to form an enclosed space that is most typically sealed against water and dirt. The enclosed space provided by a truck cap may also provide additional cargo space, greater security against loss or theft, an ability to conceal the cargo and/or potentially improved fuel efficiency of the truck.

It should be understood that terms describing the position, direction or orientation of a component of the rack are used in reference to the truck or truck bed where the rack is intended to be used. Accordingly, embodiments of the rack that have not been secured onto a truck bed may still be described as having a "front", "rear", "top", "bottom", "driver side" and "passenger side" as if it were placed in an operative position and secured to the truck bed. Furthermore, the individual components of a kit for assembly into the rack may be similarly described in reference to the component's installed position relative to a truck, where the truck cabin is in front of the truck bed. Without limitation, the truck may be a pickup truck having a cargo bed with low side walls, where the rack is supported on the side walls.

As used herein, the terms "top" and "bottom" are used synonymous with "upper" and "lower", where components referred to as being on the "top" are above components referred to as being on the "bottom." However, a first component that is a "top" component may be utilized in a configuration that has other components that are above the first component. Accordingly, a "top" position describes a physical position relative to a "bottom" position, but these terms do not imply that the "top" position is the absolute highest position possible or that the "bottom" position is the absolute lowest position possible. Specifically, an accessory such as a roof panel or camper unit may be secured above the top rails. Furthermore, the terms "front", "middle" and "rear" are used to describe a relative physical position of specified components, but do not indicate an absolute position relative to other components. For example, the top rails may support a camper unit that extends forward beyond the front rail.

As used herein, the term "upward" is used in a broad sense referring a direction from lower to higher, especially rising or extending away from a "bottom component" toward a "top component". While an upward-directed or upward-extending rail may be vertical or upright, the terms upward-directed and upward-extending are not limited to a perpendicular direction to a horizontal plane. An upward-directed or upward-extending rail may be, for example, up to a 30 degree angle off of vertical, but preferably no more than 15 degrees off of vertical. Similarly, the term "lateral" means directed sideways, and the term "longitudinal" means directed lengthwise. While a "lateral-directed" rail and/or a "longitudinal-directed" rail may be horizontal, these terms are not limited to a horizontal plane. Furthermore, a "lateral-directed" rail and/or a "longitudinal-directed" rail may be, for example, up to a 20 degree angle off of horizontal, but preferably no more than 10 degrees off of horizontal. It should be recognized that each of these terms are used relative to the orientation of a truck. For example, a horizontal plane is parallel to a plane of the truck bed or truck bed walls regardless of whether the truck itself is on a level or inclined surface.

As used herein, the terms "outward-facing" refers to a direction facing away from the middle of the rack or truck bed, and the term "inward-facing" refers to a direction facing toward the middle of the rack or truck bed. Accordingly, an "outward-facing" element may also be upward-facing, lateral-facing or longitudinal-facing, without limitation, as long as it is facing away from the rack or truck bed. Conversely, an "inward-facing" element may also be downward-facing, lateral-facing or longitudinal-facing, without limitation, as long as it is facing toward or into the middle of the rack or truck bed.

The term "frame" refers to a rigid structure that surrounds or outlines an area, such as an opening. A frame may be formed with varying numbers of components. Many of the frames may have linear rails on four sides, but a frame may also have three sides as long as it is or will be connected to another rigid structure that forms or will form a fourth side. By analogy, a house may have a window frame with four rigid sides, whereas a door frame may have only three rigid sides.

In some embodiments, the rails and corner couplings establish five frames, which may each be rectangular or trapezoidal. The five frames may include: (1) a driver side frame, (2) a front frame, (3) a passenger side frame, (4) a top frame, and (5) a rear frame. Each of the first four frames (i.e., driver side, front, passenger side, and top) may each be formed by four linear rails and four corner couplings, but the fifth frame (i.e., the rear frame) may have only three linear rails. Specifically, the rear frame may not have a bottom rail since this might interfere with access into the truck bed when desired. Any two adjacent frames may share a linear rail and two couplings at the ends of that shared linear rail. Accordingly, although a first frame might require four linear rails and four linear couplings, adding a second frame connected to the first frame may require only three additional linear rails and two additional linear couplings. After forming frames around the driver side, front and passenger side, the coupling necessary to connect with a rear frame may have already been provided such that the rear frame may be formed with only one or two additional linear rails. Furthermore, the top frame may consist of the top linear rails and top couplings already provided to form the driver side, front, passenger side and rear frames.

Some or all of the linear rails may include a T-slot formed into the cross-sectional profile of the rail and extending along the length of the rail. A T-slot is a channel or track having a cross-sectional profile that has a narrow opening and gets wider beyond the opening (sometimes resembling the shape of the capital letter "T") to provide opposing internal shoulder surfaces that can retain the head or flange of a fastener. Accordingly, a T-slot does not need to resemble the capital letter "T" as long as it provides the opposing internal shoulder surfaces and enough space for the head or flange of the fastener within the slot. A T-slot fastener has a head or flange that fits within the T-slot and may be used to secure various types of devices or accessories to one or more of the rails at any point along the length of the T-slot. The T-slot fastener may be a T-slot nut and bolt, or a T-slot stud and a nut. Either of these types of T-slot fasteners work on the same principal, but the T-slot nut has a flange with a hole having internal threads that are selectively securable to the external threads on the shaft of the bolt, whereas the T-slot stud has a flange formed to a shaft with external threads that are selectively securable to the internal threads of a nut. The flange of the T-slot fastener is positionable within the T-slot so that the flange extends under opposing shoulders formed in the T-slot. In some instances, the flange may have a first (wide) dimension and a second (narrow) dimension, such that the flange may be oriented so that its second (narrow) dimension fits between the sides of the T-slot, moved into the T-slot at a desired position along the length of the T-slot, then turned about the axis of its threads so that its first (wide) dimension extends behind the opposing shoulders of the T-slot. Alternatively, the flange of the T-slot fastener may be inserted into an open end of the T-slot and slid along the length of the T-slot to the desired position. In either case, a device or accessory may then be positioned so that tightening the T-slot fastener will secure the device or accessory to the rail.

In some embodiments, each linear rail may have two or more T-slots formed about the exterior of the linear rail profile, such as a linear rail having an inward-facing T-slot and an outward-facing T-slot extending the length of the rail. For example, the bottom rails on the driver side, passenger side and front may have both an inward-facing T-slot and an outward facing T-slot. The rails that are shared between two frames, such as the four vertical rails and the four upper rails extending between the four vertical rails, may have two outward-facing T-slots and two inward-facing T-slots. Specifically, each shared rail may be shared between a first frame and a second frame, and each shared rail may have a first outward-facing T-slot in an outer plane of the first frame and a second outward-facing T-slot in the outer plane of the second frame, as well as a first inward-facing T-slot in an inner plane of the first frame and a second inward-facing T-slot in an inner plane of the second frame. Accordingly, any or all of the frames (other than the rear frame, which may not have a bottom rail) may have inward-facing T-slots extending along each of the four sides of the frame and may have outward-facing T-slots extending along each of the four sides of the frame.

An individual rail preferably has a uniform cross-sectional profile from one end to the opposing other end. For example, the individual rails may be formed by extrusion and cut to desired lengths. However, some embodiments of the rack may include rails having a plurality of different cross-sectional profiles and/or a plurality of different lengths. For example, the number of different cross-sectional profiles for a rail may be a function of the configuration of the rack, such as the number of different angles and the inclusion of multiple frames on the same side of the rack. Without limitation, one embodiment shown in the Figures below includes rails made with seven different cross-sectional profiles, including (1) a top rear rail (Profile A), (2) a bottom front rail (Profile B), (3) a pair of top side rails (Profile C), (4) a pair of bottom side rails (Profile D), (5) a pair of vertical rear rails (Profile F), (6) a pair of vertical front rails (Profile G), and a (7) a front top rail (Profile H). The illustrated embodiment further includes a pair of optional additional rails made with an eighth (8th) cross-sectional profile, namely a vertical middle rail (Profile E) in order to form multiple frames or sub-frames on the same side, such as two driver side frames and two passenger side frames. Still, it should be recognized that embodiments may be made with a greater or lesser number of rail profiles. For example, if the front and back frames of the rack were designed with the same 9 degree inward angle, rather than the illustrated back frame having an inward angle of 9 degrees and the illustrated front frame having an outward angle of 3 degrees, then the front top rail could be identical to the back top rail. This would eliminate one of the rail profiles relative to the illustrated embodiment. Additional modifications to the design may be implemented to reduce the number of rail profiles, if desired.

In some embodiments, a plurality of the linear rails may have between 1 and 5 T-slots, including one or more outward-facing T-slots and/or one or more inward-facing T-slots. For example, a rail might have a single, outward-facing T-slot and/or a single, inward-facing slot to support exterior or interior attachment of an accessory. Alternatively, a rail might have two or more outward-facing T-slots and/or two or more inward-facing T-slots. Rails with many different configurations of inward-facing T-slots, outward-facing T-slots or the absence thereof can be incorporated into configurations of the rack in accordance with the present embodiments. In fact, one or more of the rails and/or frames may have no T-slots, so long as there is still a plurality of the rails or frames that have at least one T-slot. For example, an embodiment may have a front frame that does not include a forward-facing T-slot and/or a rear frame that does not include a rear-facing T-slot, wherein the driver side frame and/or the passenger side frame have between 1 and 5 T-slots.

In some embodiments, a coupling may be secured to each end of each rail, including any rail segment that has been cut to include an inline coupling to support an additional rail that divides a frame into two sub-frames (i.e., to form two coplanar frames on the same side of the rack). Some couplings may be secured to the ends of two rails and may be referred to as 2-way couplings, whereas other couplings may be secured to the ends of three rails and may be referred to as 3-way couplings. Some couplings are configured to connect two linear rails in an axial alignment and may be referred to as inline couplings, whereas couplings that are configured to connect rails at angles other than axial alignment may be referred to as corner couplings. Many of the corner couplings are 3-way corner couplings, but some corner couplings may also be 2-way corner couplings. Furthermore, inline couplings may be either 2-way or 3-way inline couplings.

In some embodiments, the linear connectors of the couplings have an exterior profile that is a complement to, and received within, the interior profile of the linear rail to which the linear connector is connected. Accordingly, where the interior profile of the linear rail is a complex shape, then the exterior profile of the corresponding linear connector is a similar complex shape. To form a connection, a linear connector is axially aligned with the central tube of a corresponding linear rail and, if necessary, rotated so that the exterior profile of the linear connector matches up with the interior profile of the central tube. In this position, the linear connector may be inserted into the central tube, or the central tube pressed onto the linear connector. Once connected, the interior profile of the central tube circumscribes the exterior profile of the linear connector. For example, surfaces of the interior profile and the exterior profile may be in direct contact. Furthermore, the complex shapes of the linear connector and central tube may limit or prevent rotation, since the contour of the complex shape may serve as a spline or key. Lateral movement between the linear connector and central tube is limited or prevented by having a tight dimensional tolerance (i.e., very minimal gaps) between the interior profile of the central tube and the exterior profile of the linear connector. Still further, angular deflection between the linear connector and the central tube may be limited or prevented by providing the linear connector with sufficient length for extending into the central tube. Without limitation, a linear connector preferably extends between 1.5 and 4 inches into the central tube, more preferably extends between 2 and 3 inches into the central tube, and most preferably extends about 2.5 inches into the central tube. Axial movement of the central tube of the linear rail relative to the linear connector of the coupling may be limited with the use of set screws that extend through a side wall of the central tube and into the linear connector. Even further, the desired initial axial positioning of the linear rail relative to the coupling may be established by providing the coupling with a shoulder around some or all of the linear connectors. Accordingly, the linear rail may be pushed onto the coupling until the end of the central tube has been received about the linear connector, slid over the exterior surfaces of the linear connector, and come into abutment with the shoulder. With the end of the central tube abutting the shoulder, one or more holes in the central tube will preferably align with one or more holes in the linear connector such that one or more set screw may be secured between the one or more aligned holes. The set screw holes in the rails and couplings are preferably positioned on an inward-facing side of the rails and couplings for case of access, to maintain a clean exterior appearance, and to reduce the potential for water seeping into the rail.

In some embodiments, the couplings may be made with any rigid material, but preferably made with a lightweight, durable and strong material such as fiber reinforced plastics and/or lightweight, strong metals. A non-limiting example of a suitable rigid polymeric material is acrylonitrile butadiene styrene (ABS) and a non-limiting example of a suitable lightweight metal is aluminum (typically in the form of an aluminum alloy). Other compositions and composite materials may be used without limitation. One preferred coupling may be a composite material formed by a polymeric material with glass infill, such as ABS combined with glass fibers. The glass fiber content may be between 5 and 30 percent, preferably between 15 and 25 percent, and more preferably about 20 percent. A rigid polymeric coupling may be formed by injection molding of the polymeric material, such as a composite of ABS and glass fibers. Although the selection of a rigid polymeric material is important to the strength and durability of the coupling, and especially the linear connectors, the cross-sectional dimensions of the linear connector and the complementary cross-sectional dimensions of the central tube may be controlled to provide sufficient strength to the rack for any selected material. Furthermore, if the interior profile of the central tube has one or more narrow crevice, perhaps a crevice having a width less than ¼ inch, then the complementary exterior profile of the corresponding linear connector does not need to include such a narrow element since it would provide a negligible contribution to strength.

In some embodiments, the rigid body of each coupling may include a shoulder around each linear connector, where the shoulder seats against the end of a corresponding linear rail. Due to the shoulder seating against the end of the linear rail and the exterior profile of the linear connector being circumscribed by the interior profile of the rail's central tube, the connection between a coupling and a linear rail resists water intrusion into the central tube. Furthermore, the shoulder preferably has a profile that avoids blocking the end of the outwardly directed T-slot. Most preferably, the shoulders that align with the outwardly directed T-slots will have a width equal to the thickness of the central tube wall such that the outer surfaces of the coupling and T-slot are flush, such as directly abutting and forming a continuous surface with no gaps there between. In one option, the shoulders and the outward-facing surface of the coupling may have a contour that retains full access to the ends of the one or more T-slots of the linear rails that are connected to the coupling. Providing full access to the ends of the T-slots enables the flange of a T-slot fastener to be slid into the T-slot from the end where the coupling is attached. Furthermore, full access to the ends of the T-slots allows water, such as rainwater, to easily drain out of the T-slots at any point where there is a coupling. Accordingly, the linear rails will have a coupling at each end that is configured so that water may drain in either or both directions (i.e., to cither end of the T-slot) depending upon the way the truck bed is tilted from moment to moment. Furthermore, since water may drain from both a bottom rail and a top rail, the couplings may be configured or contoured so that water emptying from a top rail can flow downward into and through a T-slot in an upward directed linear rail that is connected to the same coupling.

In some embodiments, the linear rails and couplings may be connected to form two driver side frames and two passenger side frames, wherein the two driver side frames are coplanar, connected by two driver side inline couplings and share a first upward directed middle rail connected between the two driver side inline couplings, and wherein the two passenger side frames are coplanar, connected by two passenger side inline couplings and share a second upward directed middle rail connected between the two passenger side inline couplings. Optionally, any of the frames may be divided into multiple frames or sub-frames using an additional rail and a pair of inline couplings. For example, two linear rails on opposing sides of an initial frame may each be cut for the insertion of two molded inline (T-shaped) couplings between the cut ends of the two linear rails. An additional rail may then be secured between the two inline couplings to form a frame or sub-frame on both sides of the additional rail. In a preferred configuration, the driver side frame and the passenger side frame will both be divided into two frames or sub-frames using an additional upward extending rail and a pair of T-shaped inline couplings. The additional rail and couplings may add strength to the rack and may also add functionality by creating a greater number of frames where accessories may be secured.

In some embodiments, the driver side frame, the front frame and the passenger side frame each include a bottom rail, wherein the bottom rail of each frame has a bottom surface that lies in a common plane. Accordingly, the bottom surface of the bottom rail may engage the top surface of a cargo bed side wall and facilitate a connection therebetween. For example, the bottom rail may be secured to the cargo bed side wall using clamps, such as C-clamps or specialized truck topper clamps. Preferably, each of the driver side frame, the front frame and the passenger side frame will be clamped to the cargo bed side wall using one or more clamps. Furthermore, embodiments may include a weather sealing strip disposed between the bottom frames and the top surface of the cargo bed side wall in order to form a water resistant seal and/or to protect the paint on the top surface from scratches or abrasion.

In some embodiments, one of more of the frames of the rack may be angled relative to a vertical or horizontal frame of reference established by the truck bed floor or the top edge of the truck cargo bed side wall. For example, the driver side frame(s) and the passenger side frame(s) may be angled laterally inward at a first angle, the rear frame may be angled forward at a second angle and the front frame(s) may be angled forward (or rearward) at a third angle. In one non-limiting embodiment, the rear of the rack may angle forward at a 5-15 degree angle (preferably about a 9 degree forward angle), the front of the rack may angle forward at a 1-10 degree angle (preferably about a 3 degree angle), and the sides of the rack may angle inward at a 5-20 degree angle (preferably about a 15 degree angle). Such angles, if any, may be selected for aesthetic purposes and/or performance purposes, such as avoiding wind resistance during travel. However, since these angles are implemented with the couplings and rails, every asymmetry in the rack causes an increase in the number of different rail profiles and corresponding coupling linear connectors. For example, the plurality of the couplings may include corner couplings having three linear connectors with three different exterior profiles for connecting to three rails having central tubes with three different interior profiles. Furthermore, a first of the three linear connectors may be directed for connection with an upward directed rail, a second of the three linear connectors may be directed for connection with a lateral directed rail, and a third of the three linear connectors may be directed for connection with a longitudinal directed rail.

In some embodiments, the outwardly directed T-slots in the linear rails that form a particular frame may lie in a first plane. Similarly, inwardly directed T-slots in the linear rails that form the particular frame may lie in a second plane, wherein the second plane is preferably parallel to the first plane. Accessories of various types and configurations may be attached to both the inwardly directed T-slots and the outwardly directed T-slots. For example, the outwardly directed T-slots may secure a window unit that seals to the frame and prevents water and dust from entering there between, while the inwardly directed T-slots may secure a cargo mounting plate to support tools, supplies or equipment. Other suitable combinations of accessories should be apparent in view of the present disclosure.

In some embodiments, the driver side frame(s), the front frame(s), and the passenger side frame(s) each include two upward-directed rails and two lateral/longitudinal-directed rails, where any two adjacent frames share a rail. Any or all shared rails may have two outwardly directed T-slots, so that a first of the two outwardly directed T-slots is available for use by a first one of the adjacent frames and a second of the two outwardly directed T-slots is available for use by a second one of the adjacent frames. Where the adjacent frames are coplanar, the two outwardly directed T-slots may also be coplanar. However, where the adjacent frames are in different planes, such as one front frame and one side frame, the shared rail may have a first outwardly directed T-slot lying in a plane of the first frame (such as the front frame) and a second outwardly directed T-slot lying in a plane of the second frame (such as the driver side frame).

In some embodiments, the driver side frame, the front frame, the passenger side frame, and the rear frame each include a top rail that is shared with the top frame. Each of the top rails may include an upward facing T-slot for use in the plane of the top frame and a lateral or longitudinal facing T-slot for use in the plane of the driver side frame, the front frame, the passenger side frame, or the rear frame.

In some embodiments, one or more of the rails may have more than one T-slot facing in the same direction. For example, the top rails may have two T-slots that are upwardly directed and positioned side-by-side to provide a more versatile mounting solution. Dual slots may enable more devices or accessories to be mounted or more T-slot fasteners to be used to connect an individual device or accessory with a stronger connection. In one example, one T-slot on each of two opposing top rails could be used to mount a set of crossbars across the top of the rack from driver side to passenger side, yet leaving another T-slot on each of the rails that could be used to mount other items such as an item that might hang over the side of the rack. In another example, a device may use T-slot fasteners that connect with the two side-by-side T-slots, such as a rectangular layout of four T-slot fasteners on one top rail and a rectangular layout of four T-slot fasteners on an opposing top rail.

In some embodiments, one or more devices or accessories may be secured to one or more of the rails using one or more T-slot fasteners. Where the device or accessory has sufficient dimensions, the device or accessory may be secured to one or more rails with multiple T-slot fasteners. In one example, a device or accessory may be secured to two rails of a frame using at least two T-slot fasteners, such as two opposing linear rails of the same frame. However, a device or accessory may be secured to any number of rails using any number of T-slot fasteners. Many types of devices or accessories, such as a cargo mounting plate (i.e., a Molle panel), window panel, door panel, or roof panel, may be secured to multiple rails of the same frame using the T-slots on the same inner or outer side of the frame. Yet, the embodiments are not limited to securing an individual device or accessory to a single frame. For example, a ski rack or bike rack might be secured to the rack using the T-slots on the driver side frame and the passenger side frame that are laterally outward directed in generally opposite directions.

Some embodiments provide a kit for forming a rack. The kit comprises a set of linear rails, wherein each linear rail has a uniform cross-sectional profile along its length, wherein the uniform cross-sectional profile has an outer profile that forms an outwardly directed T-slot and a central tube having an interior profile that is a complex shape. The kit further comprises a set of couplings, wherein each coupling includes a rigid body and a plurality of linear connectors extending from the rigid body. For each of the linear connectors, the linear connector has an exterior profile that is a complement to and receivable within the interior profile of one of the linear rails to which the linear connector is to be connected, such that the central tube circumscribes the exterior profile of the linear connector when the linear connector is inserted into the central tube. The set of linear rails and the set of couplings are adapted to form a structural framework in which each linear rail has a first end connectable to one of the couplings and a second end connectable to another of the couplings and wherein the linear rails and the couplings are connectable to form a driver side frame, a front frame, a passenger side frame, a rear frame and a top frame.

In some embodiments, the kit may further comprise a plurality of set screws, each set screw for securing a connection between one of the linear connectors and an end of one of the linear rails.

In some embodiments, the kit may further comprise a plurality of T-slot fasteners and one or more accessories, wherein each accessory is securable to the outwardly directed T-slot of one or more of the linear rails using one or more of the T-slot fasteners. Optionally, the one or more accessories may be selected from a cargo mounting plate, a window, a door, and a roof panel.

In some embodiments, the kit may include a camper or rooftop tent having tent sides made of a durable weather resistant fabric with fabric pass throughs that act as a window. While such a camper may be secured to the top rails of the rack using T-slot fasteners and upward-directed T-slots, the camper may also be secured to the top rails with clamps.

It should be recognized that embodiments of the rack may incorporate any of the features, components or aspects of one or the kits, and the embodiments of the kit may incorporate any of the features, components, or aspects of the rack described herein. Furthermore, the embodiments may include a truck cap that comprises the rack and those accessories or features that transform the rack into a truck cap or a kit for forming a truck cap.

FIG. 1 is a perspective view of a rack 10 secured to a bed 12 of a truck 14 according to some embodiments. The truck bed 12 includes a floor 13 and low side walls 16 along the driver side, front and passenger side. The truck bed 12 further includes a rear tailgate 18, which is shown in a closed position.

The rack 10 is secured to the top surface 17 of the low side walls 16. In this operative position, the rack 10 moves with the truck 14 and may be used to secure cargo, such as tools, equipment, supplies, personal articles, and the like. While the truck 14 and the truck bed 12 may be inclined according to the terrain on which it is traveling or resting, the truck itself may be used as a point of reference for discussing the construction of the rack 10. For example, the truck 14 and/or truck bed 12 may define an X-Y plane, such as along the floor 13 of the truck bed 12 and/or the top surfaces 17 of the side walls 16. As illustrated, a longitudinal axis or direction may extend from the front of the truck to the back of the truck and may be labeled the "X" axis or direction. A lateral axis or direction may extend between the driver side and the passenger side of the truck and may be labeled the "Y" axis or direction. Furthermore, a vertical or upright axis or direction may extend up and down perpendicular to the X-Y plane and may be labeled the "Z" axis or direction.

Figure 2:
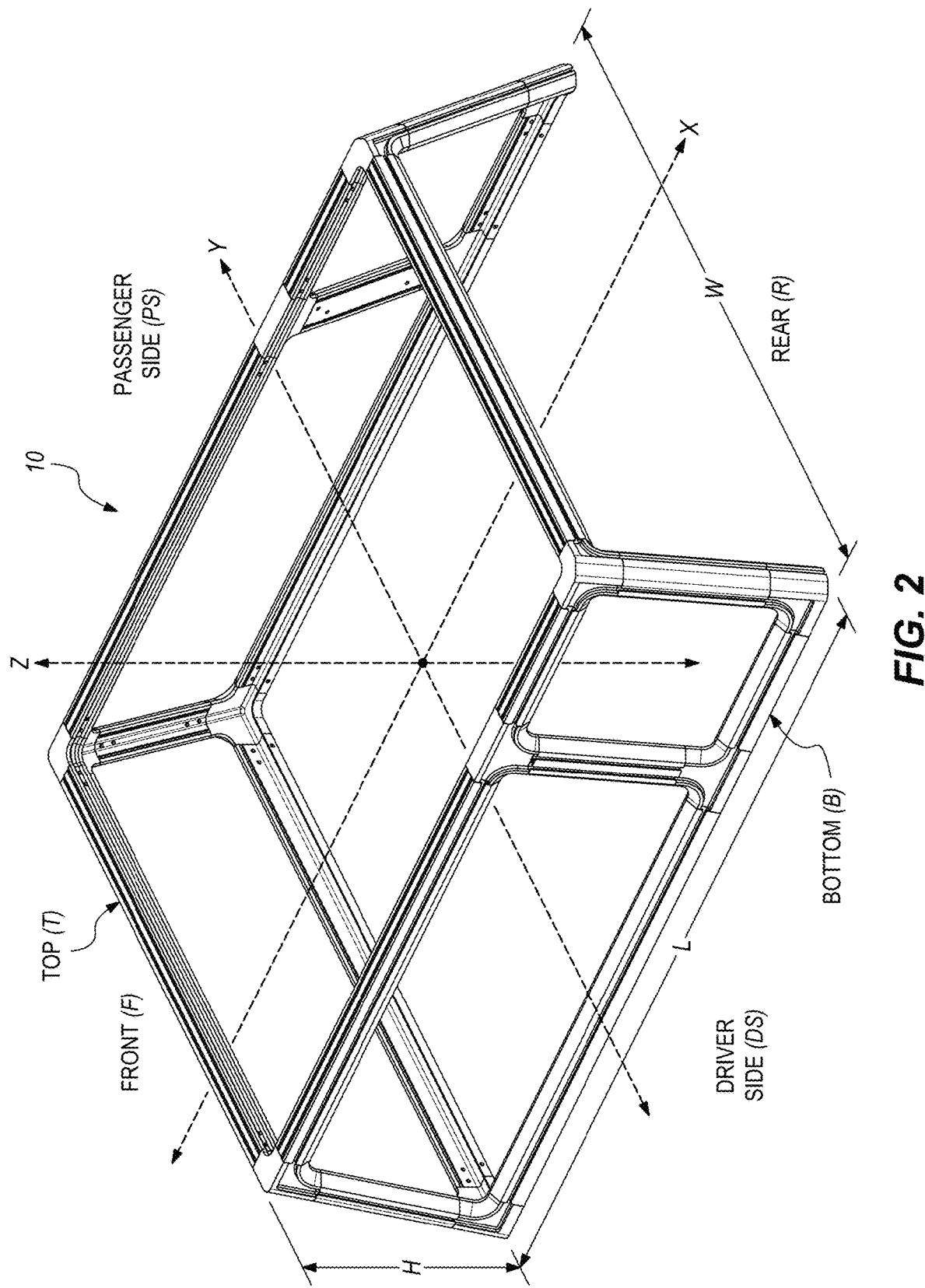
FIG. 2 is a perspective view of a plurality of frames and sub-frames that form the rack according to some embodiments.

FIG. 2 is a perspective view of the rack 10 according to some embodiments. The rack 10 may have overall dimensions including a length (L), width (W) and height (H). The length (L) is the distance measurement along the X-axis from the front (F) to the rear (R), width (W) is the distance measurement along the Y-axis from the driver side (DS) to the passenger side (PS), and height (H) is the distance measurement along the Z-axis from the bottom (B) to the top (T). These dimensions or measurements generally correspond with the dimensions of the truck bed 12 shown in FIG. 1 so that the bottom of the rack 10 may be secured to the top surface of the side walls.

The rack 10 includes a plurality of frames. As shown in FIG. 2, the rack 10 has a total of seven (7) frames, including two driver side frames, one front frame, two passenger side frames, a rear frame, and a top frame. Each frame may include a number of linear rails and couplings and may define a plane. For example, the two driver side frames defines in a first plane, the front frame defines a second plane, the two passenger side frames define a third plane, the rear frame defines a fourth plane, and the top frame defines a fifth plane. While the rails along the bottom (B) of the rack 10 are each included in only one frame, the remaining rails are shared between two adjacent frames. The shared rails are shown having at least one T-slot that lies in the plane of each frame that shares the rail. For example, the driver side top rails have a T-slot lying in the plane of the driver side frames as well as a T-slot lying in the plane of the top frame.

Figure 3A:
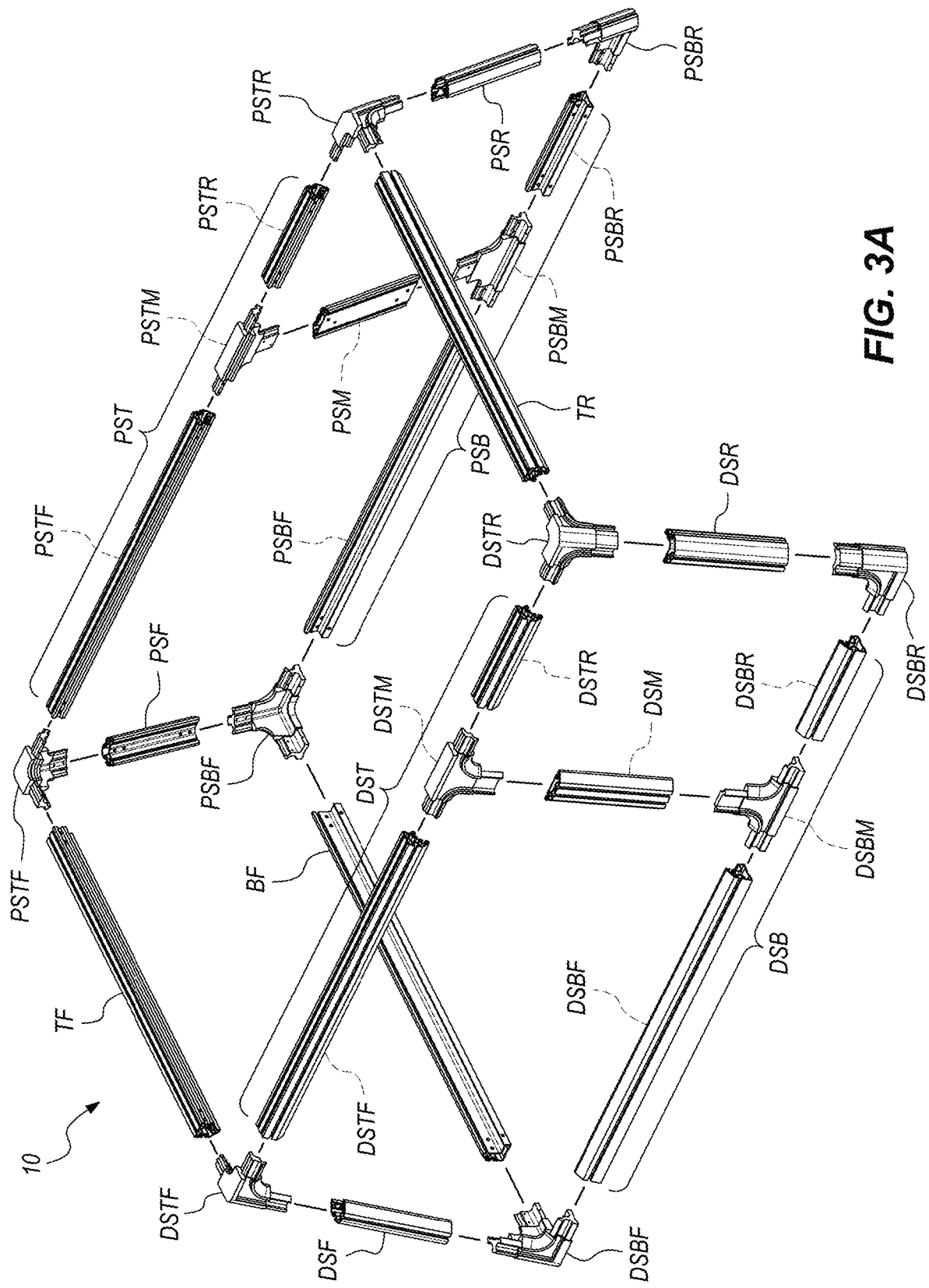
FIGS. 3A-D are assembly views of the rack showing the positions of various couplings and rails during sequential stages of assembly according to some embodiments.

FIGS. 3A-D are assembly views of the rack showing the positions of various couplings and rails during sequential stages of assembly according to some embodiments. FIG. 3A is an assembly view of the rack 10 showing the positions of various couplings and rails according to some embodiments. The construction of many of the couplings and rails is a function of their position within the rack 10. Accordingly, each coupling and rail has been assigned an abbreviation that corresponds to its location within the rack 10, first including one or more letter for the side, then a letter to indicate either top or bottom (if either), and a letter to indicate a position within the side (if any). As shown in FIG. 3A and in Tables 1 and 2, below, the following abbreviations for the sides are: driver side (DS), front (F), passenger side (PS), rear (R), and top (T). The abbreviations for top (T) and bottom (B) are used to indicate upper or lower positions, and the abbreviations for front (F), middle (M) and rear (R) may be used to indicate longitudinal position.

As listed in Table 1 and shown in FIG. 3A, this embodiment includes 17 linear rails including 8 different rail profiles (A-H). The 8 different profiles are necessary in this embodiment due to the unique angles of the rear frame (see $\Theta_R$ in FIG. 5A), driver side and passenger side frames (see $\Theta_{DS}$ and $\Theta_{PS}$ in FIG. 5B), and front frame (see OF in FIG. 5A). As shown in Table 1, there is only one rail with Profile A (Top Rear—TR), only one rail with Profile B (Bottom Front—BF), and only one rail with Profile H (Top Front—TF). There are two rails with Profile E (Driver Side Middle—DSM; and Passenger Side Middle—PSM), two rails with Profile F (Driver Side Rear—DSR; and Passenger Side Rear—PSR), and two rails with Profile G (Driver Side Front—DSF; and Passenger Side Front—PSF). In addition, there are four rails with Profile C (Driver Side Top Front—DSTF; Driver Side Top Rear—DSTR; Passenger Side Top Front—PSTF; and Passenger Side Top Rear—PSTR) and Profile D (Driver Side Bottom Front—DSBF; Driver Side Bottom Rear—DSBR; Passenger Side Bottom Front—PSBF; and Passenger Side Bottom Rear—PSBR).

TABLE 1

Rail Locations, Abbreviations and Profiles

| | Rail Location | Abbreviation | Profile |
|---|---|---|---|
| 1 | Top Rear | TR | A |
| 2 | Bottom Front | BF | B |
| 3 | Driver Side Top Front | DSTF | C |
| 4 | Driver Side Top Rear | DSTR | C |
| 5 | Passenger Side Top Front | PSTF | C |
| 6 | Passenger Side Top Rear | PSTR | C |
| 7 | Driver Side Bottom Front | DSBF | D |
| 8 | Driver Side Bottom Rear | DSBR | D |
| 9 | Passenger Side Bottom Front | PSBF | D |
| 10 | Passenger Side Bottom Rear | PSBR | D |
| 11 | Driver Side Middle | DSM | E |
| 12 | Passenger Side Middle | PSM | E |
| 13 | Driver Side Rear | DSR | F |
| 14 | Passenger Side Rear | PSR | F |
| 15 | Driver Side Front | DSF | G |
| 16 | Passenger Side Front | PSF | G |
| 17 | Top Front | TF | H |

As listed in Table 2 and shown in FIG. 3A, this embodiment includes 12 couplings including 34 linear connectors. The 34 linear connectors are arranged to connect to each end of the 17 linear rails (i.e., 2 linear connectors per linear rail). Note that none of the 12 couplings are duplicated. Every coupling is unique where, as in this embodiment, the angle of the rear OR, the angle of the sides (ODS and OPS) and the angle of the front OF are not the same.

For example, the DSTF and PSTF couplings are unique even though they both have an X-directed linear connector with Profile C, a Y-directed linear connector with Profile H, and a Z-directed linear connector with Profile G. This uniqueness is because the X-directed linear connector of DSTF enters the rail with Profile C from a different end than does the X-directed linear connector of PSTF, such that the two X-directed linear connectors are mirror images of each other (i.e., complements of opposite ends of the respective DSTF and PSTF rails with Profile C). The uniqueness is also because the Y-directed linear connector of DSTF enters the TF rail with Profile H from a different end than does the Y-directed linear connector of PSTF, such that the two Y-directed linear connectors are mirror images of each other (i.e., complements of opposite ends of the TF rail with Profile H).

The DSTM and PSTM couplings are unique even though they have the same three linear connector profiles directed in the same general direction. Specifically, the DSTM angles down and to the rear at the same angle as the rear frame OR. If DSTM were used on the passenger side, the Z-connector would be angled forward rather than rearward. The same explanation applies to the uniqueness of DSBM and PSBM. The rail and coupling connector profiles are described in greater detail in reference to FIGS. 5A-D and FIGS. 6A-H.

TABLE 2

Coupling Locations, Abbreviations and Profiles/Directions

| | Coupling Location | Abbreviation | Direction | Profile |
|---|---|---|---|---|
| 1 | Driver Side Top Front | DSTF | X | C |
| | | | Y | H |
| | | | Z | G |
| 2 | Driver Side Bottom Front | DSBF | X | D |
| | | | Y | B |
| | | | Z | G |
| 3 | Driver Side Top Middle | DSTM | X | C |
| | | | X | C |
| | | | Z | E |

TABLE 2-continued

Coupling Locations, Abbreviations and Profiles/Directions

| | Coupling Location | Abbreviation | Direction | Profile |
|---|---|---|---|---|
| 4 | Driver Side Bottom Middle | DSBM | X | D |
| | | | X | D |
| | | | Z | E |
| 5 | Driver Side Top Rear | DSTR | X | C |
| | | | Y | A |
| | | | Z | F |
| 6 | Driver Side Bottom Rear | DSBR | X | D |
| | | | Z | F |
| 7 | Passenger Side Top Front | PSTF | X | C |
| | | | Y | H |
| | | | Z | G |
| 8 | Passenger Side Bottom Front | PSBF | X | D |
| | | | Y | B |
| | | | Z | G |
| 9 | Passenger Side Top Middle | PSTM | X | C |
| | | | X | C |
| | | | Z | E |
| 10 | Passenger Side Bottom Middle | PSBM | X | D |
| | | | X | D |
| | | | Z | E |
| 11 | Passenger Side Top Rear | PSTR | X | C |
| | | | Y | A |
| | | | Z | F |
| 12 | Passenger Side Bottom Rear | PSBR | X | D |
| | | | Z | F |

When the linear connectors on the couplings and central tubes in the rails are axially aligned as shown in FIG. 3A, then they can be pressed together and secured to form the rack 10 as shown in FIG. 2. In some embodiments, the couplings and rails are assembled in a sequence according to FIGS. 3B-D.

Figure 3B:
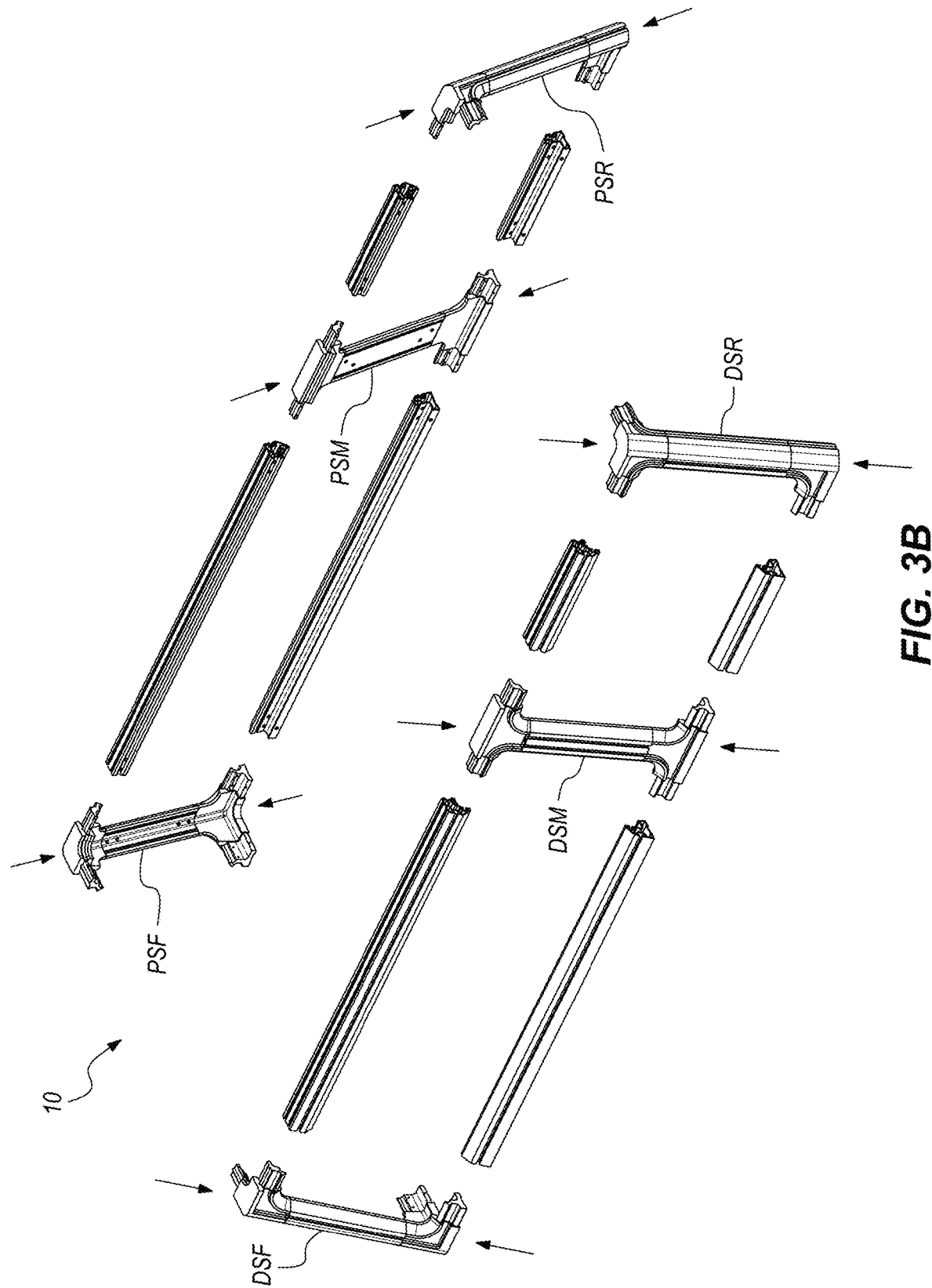

FIG. 3B is an assembly view of a portion the rack 10 showing certain of the couplings and rails from FIG. 3A connected together during a first stage of assembly according to some embodiments. In particular, the first stage of assembly includes connecting each end of the upward directed rails (DSR, DSM, DSF, PSF, PSM and PSR) with the corresponding connector of the appropriate coupling. These connectors connections are made by axially aligning a connector of the coupling with the open central tube of the corresponding rail and then pressing (in the direction of the arrows) each connector into the central tube. Preferably, the connection is secured using one or more set screw (see FIG. 8). Accordingly, each upward directed rail is connected to two couplings to form a subassembly as shown. For the present embodiment, there are six upward directed rails, and twelve couplings that form six subassemblies. The correspondence between the individual rails and individual connectors of specific couplings is described in greater detail in reference to FIGS. 4-8. These subassemblies are preferably formed first due to the potentially different front rail angle (OF), rear rail angle (OR) and/or middle rail angle (OM) described in reference to FIG. 5A.

Figure 3C:
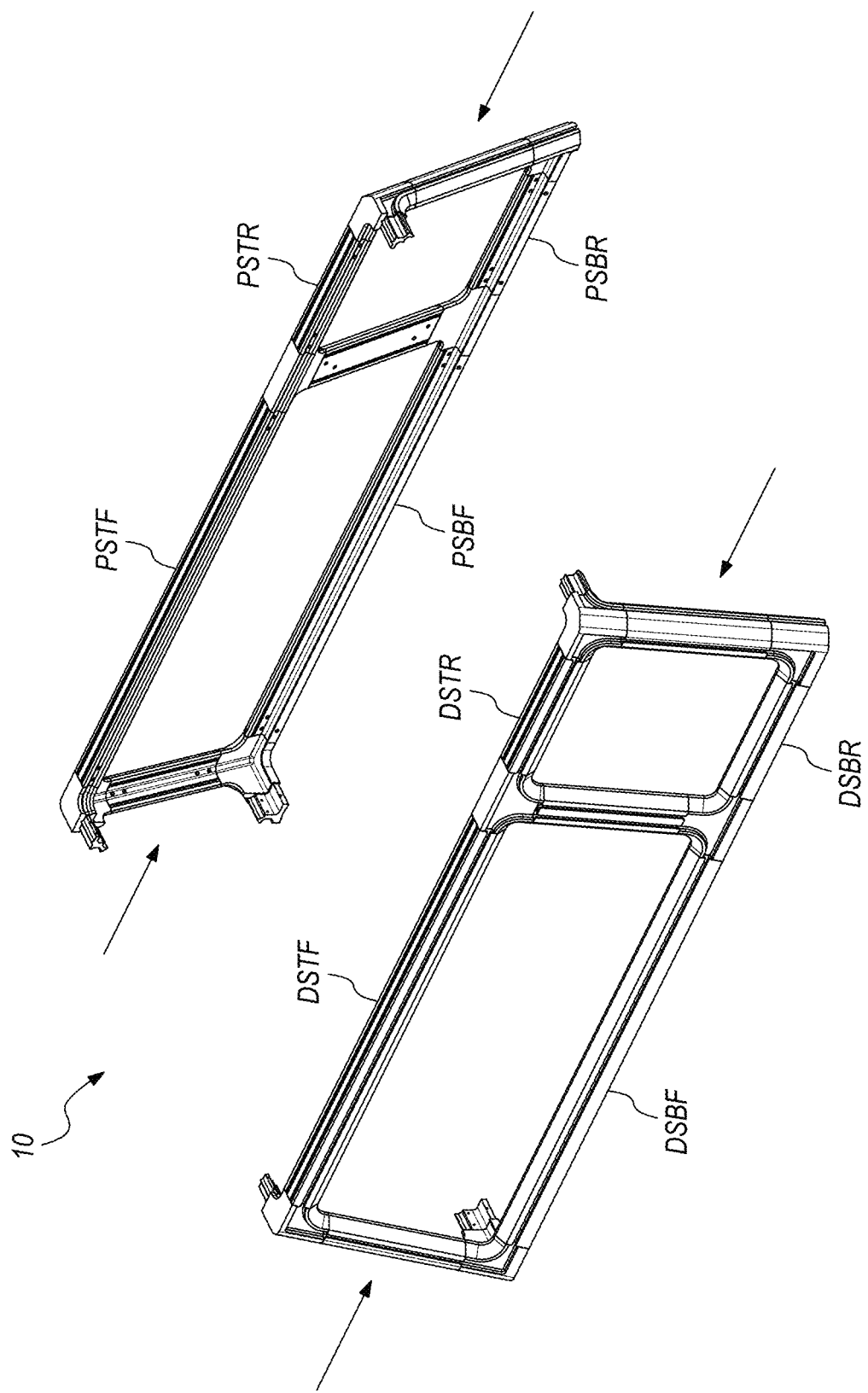

FIG. 3C is an assembly view of a portion of the rack 10 showing certain couplings and rails connected together during a second stage of assembly according to some embodiments. As shown, the six subassemblies formed in reference to FIG. 3B are connected with the side rails to form two side subassemblies. More specifically, the driver side longitudinal rails (DSTF, DSBF, DSTR and DSBR) are connected between the three driver side subassemblies of FIG. 3B to complete the driver side subassembly by pressing (in the direction of the arrows) the longitudinal connectors of the subassemblies into the central tubes of the rails. Similarly, the passenger side longitudinal rails (PSTF, PSBF, PSTR and PSBR) are connected between the three passenger side subassemblies of FIG. 3B to complete the passenger side subassembly by pressing (in the direction of the arrows) the longitudinal connectors of the subassemblies into the central tubes of the rails.

Figure 3D:
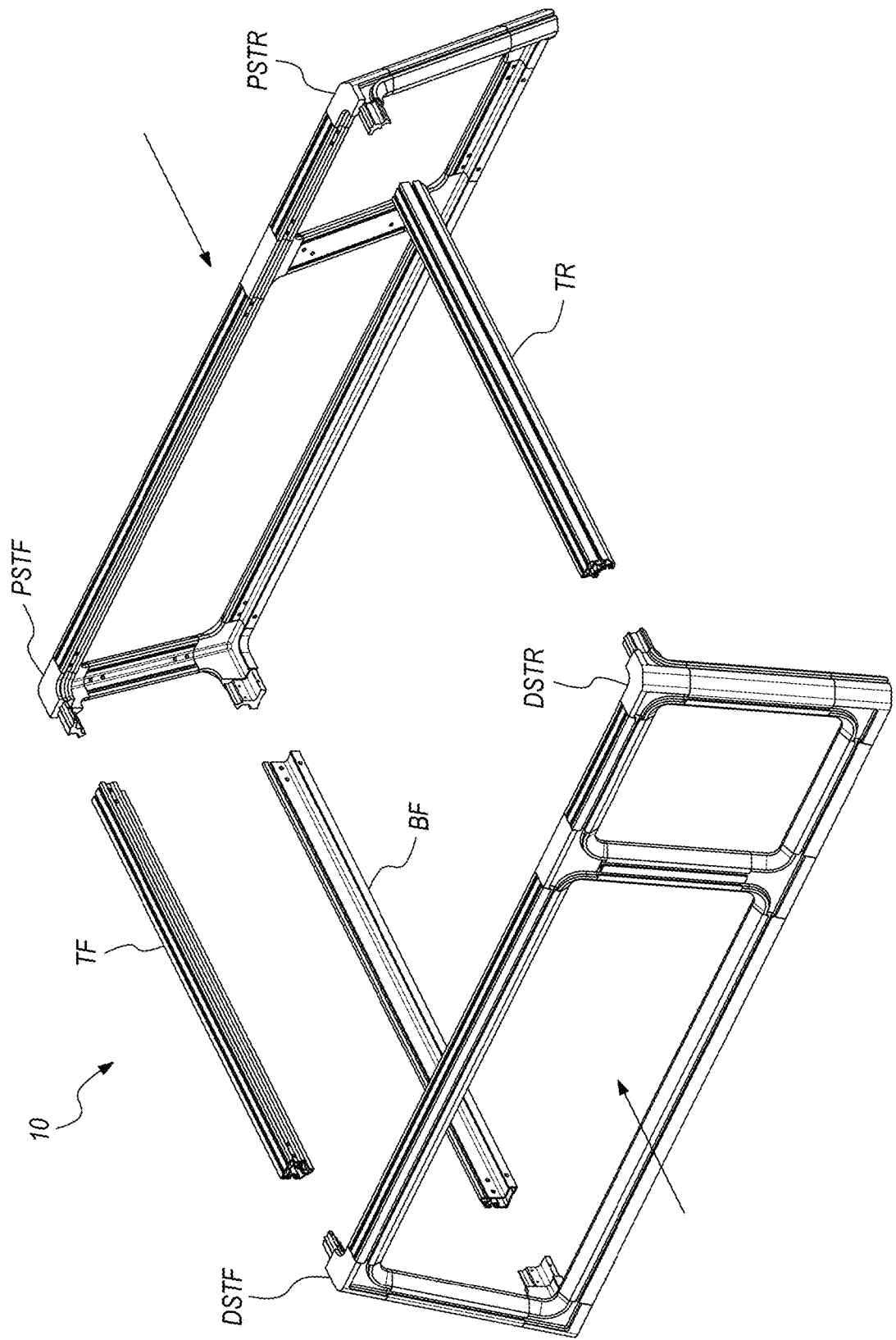

FIG. 3D is an assembly view of the rack 10 showing certain couplings and rails connected together during a third stage of assembly according to some embodiments. As shown, the lateral connectors of the driver side subassembly and the passenger side subassembly are aligned with the lateral rails (TF, BF and TR) and then pressing (in the direction of the arrows) the lateral connectors into the respective ends of the central tubes within the rails. With the driver side subassembly and the passenger side subassembly connected together in this manner, the rack 10 is fully assembled as shown in FIG. 2. Furthermore, each connection within the rack may receive one or more set screw to prevent the rail from pulling away from the coupling connector. The use of set screws is shown in greater detail in FIG. 8.

It should be recognized that the rack 10 in FIG. 2 is ready for installation and use with a truck as shown in FIG. 1. Accordingly, the rack 10 of FIG. 2 may be subsequently secured to the truck bed as shown in FIG. 1 using, for example, clamps as shown in FIG. 9D. It should be understood that the components in FIG. 3A may form a kit that may be assembled to form the rack of FIG. 2. Accessories may also be secured to the rack 10 before or after securing to a truck.

Figure 4:
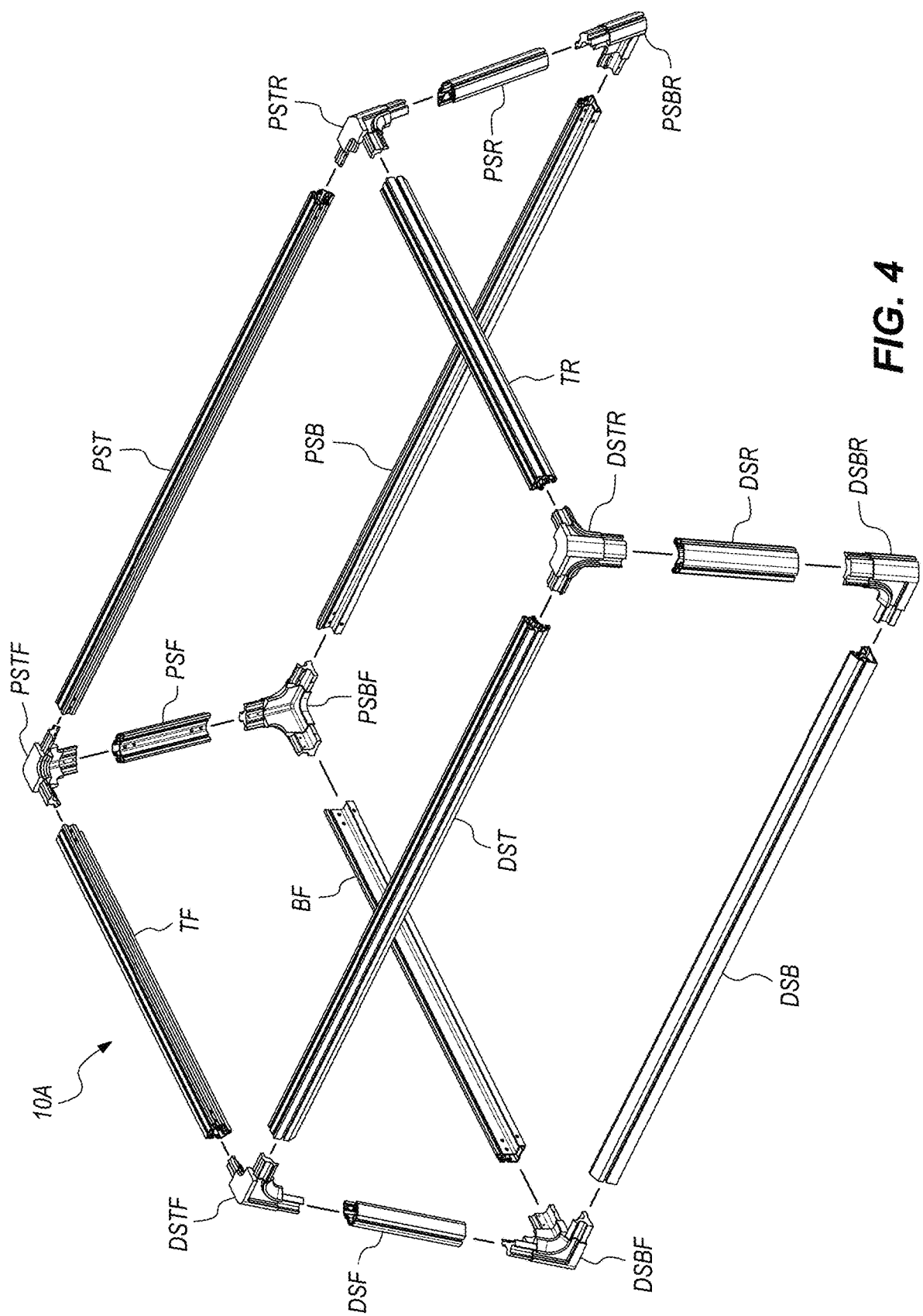
FIG. 4 is an assembly view of the rack showing the positions of various couplings and rails according to some embodiments.

FIG. 4 is an assembly view of a rack 10A showing the positions of various couplings and rails according to some embodiments. The nomenclature used in FIG. 4 is the same as that adopted in FIG. 3. However, the rack 10A is simplified by having only one driver side frame and only one passenger side frame. This eliminates the four inline couplings DSTM, DSBM, PSTM and PSBM, as well as the two rails DSM and PSM. In addition, the DSTF and DSTR rails are replaced with a single DST rail, and the PSTF and PSTR rails are replaced with a single PST rail. Accordingly, the rack 10A has 8 unique corner couplings and 11 total linear rails. Other aspects and details about this second embodiment of the rack 10A may be the same as those of the first embodiment of the rack 10.

FIGS. 5A-D are plan views of the rack 10 as seen from the driver side, front, passenger side and rear, respectively. In FIG. 5A, the driver side of the rack 10 includes a driver side front frame 20 and a driver side back frame 22. The middle rail DSM and the two middle couplings DSTM and DSBM connected to the middle rail DSM are shared between the driver side front frame 20 and a driver side back frame 22. However, the rails forming the driver side front frame 20 provide outwardly facing T-slots 24 on each side of the frame 20, such that these four T-slots 24 lie in a plane. Similarly, the rails forming the driver side back frame 22 provide outwardly facing T-slots 26 on each side of the frame 22, such that these four T-slots 26 lie in the same plane. The 6 driver side couplings have recessed faces 28 that provide full access to the ends of the outwardly facing T-slots 24, 26 in the rails to which the couplings are connected.

Note that the rear plane (see right-hand side of the FIG. 5A) defined by DSTR, DSR and DSBR is angled forward at an angle $\Theta_R$ and the middle rail DSM is parallel to the rear rail DSR. By contrast, the front plane (see left-hand side of the FIG. 5A) defined by DSTF, DSF and DSBF is angled forward at an angle $\Theta_F$. In this illustration, $\Theta_R$ is about 9 degrees and $\Theta_F$ is about 3 degrees.

The cross-sections C, D, E, F and G are directed though each of the connections between a rail and a linear connector of a coupling. These cross-sections are illustrated in FIGS. 6A-H. However, it is important to note that two connections that are identified in FIG. 5A as having the same cross-sectional profile, such as Profile C, are not identical if the linear connector enters the rail from a different direction or side. Profile C is illustrated in FIG. 6C and is representative of the longitudinal (X-directed) linear connector of DSTM (see element 27 in FIG. 5A) as viewed looking away from the coupling body. However, Profile C is representative of the longitudinal (X-directed) linear connector of DSTF (see element 25 in FIG. 5A) as viewed looking toward the coupling body. Accordingly, these two X-directed linear connectors are mirror images of each other in order to fit into opposite ends of the central tube in the same rail. Many of the linear connectors forming the frames 20, 22, as well as frames shown in all of FIGS. 5A-D, have this type of mirror image relationship in order to fit into opposite ends of the same linear rail regardless of its profile.

FIG. 5B is a plan view of the rack 10 as seen from the front. The front frame 34 includes the rails DSF, BF, PSF and TF and the couplings DSTF, DSBF, PSTF and PSBF. Note that DSTF, DSF and DSBF are all shared with the driver side front frame 20. Also note the angles $\Theta_{PS}$ and Ops are illustrated as being about 15 degrees. The linear connectors involved in forming the front frame include Profiles B, G and H, where there are linear connectors that are both mirror images of these profiles. The rails forming the front frame 34 provide T-slots 36 around the four sides and the couplings forming the front frame 34 have recessed faces 28 that provide full access to the ends of the outwardly facing T-slots 36 in the rails to which the couplings are connected.

FIG. 5C is a plan view of the rack 10 as seen from the passenger side. Many of the features of the passenger side front frame 30 and passenger side rear frame 32 are symmetrical to features on the driver side. However, in reference to both FIGS. 5C and 5A, the forward angles $\Theta_R$ and $\Theta_F$ cause the elements to tilt upward to the right in FIG. 5C rather than upward to the left in FIG. 5A. Again, the linear connector profiles are noted and include the mirror images thereof. Note that PSTF, PSF and PSBF are all shared with the front frame 30. Furthermore, the passenger side front frame 30 provides T-slots 24 along all four sides which align with the recessed surfaces 28 in the corresponding couplings, and the passenger side rear frame 32 provides T-slots 26 along all four sides which align with the recessed surfaces 28 in the corresponding couplings. The recessed surfaces 28 of the shared couplings PSTM and PSBM align with and allow full access to a T-slot 24 in one direction and a T-slot 26 in the opposite direction.

FIG. 5D is a plan view of the rack 10 as seen from the rear. The Figure shows the rear frame 34, the side angles $\Theta_{DS}$ and $\Theta_{PS}$ and the linear connector profiles A and F and their mirror images. Note that PSTR, PSR and PSBR are all shared with the passenger side rear frame 32, and that DSTR, DSR and DSBR are all shared with the driver side rear frame 22.

In some embodiments, the driver side rear (DSR) and passenger side rear (PSR) rails (Profile F) may each include an outward-facing and rearward-facing slot 35 that is not a T-slot. This slot or groove 35 is provided to direct water down the side of the rack and away from the opening in the rear frame, which may secure a hatch/door. For context, the positions of the tailgate 18 and the cargo bed side walls 16 are illustrated in dashed lines.

Figure 6A:
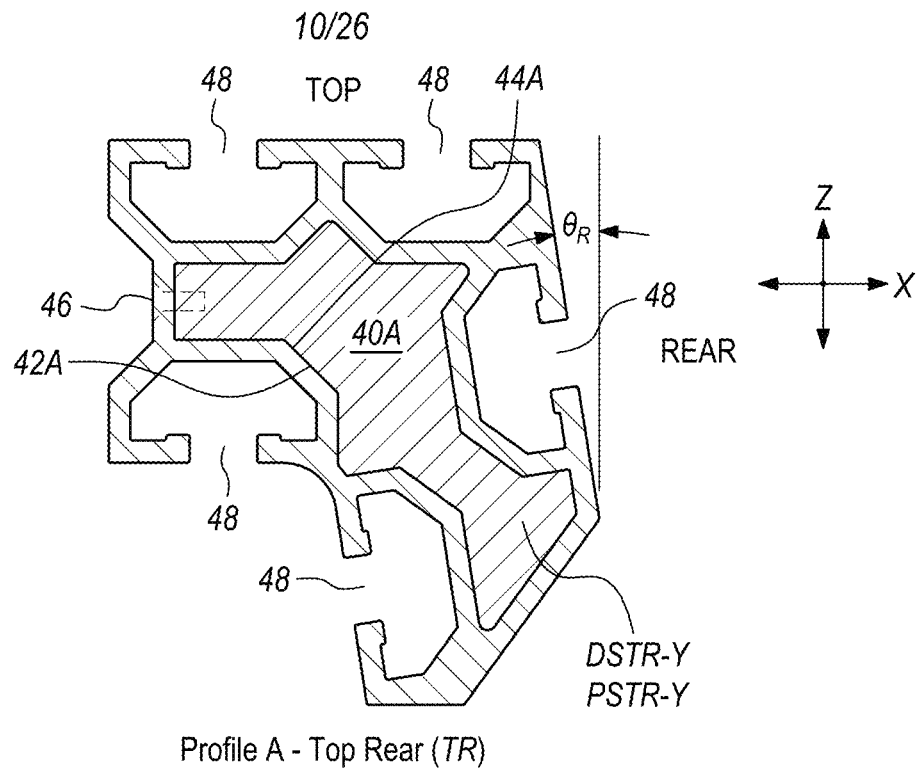
FIGS. 6A-H are cross-sectional views of certain connections between a coupling and a rail.
Figure 6B:
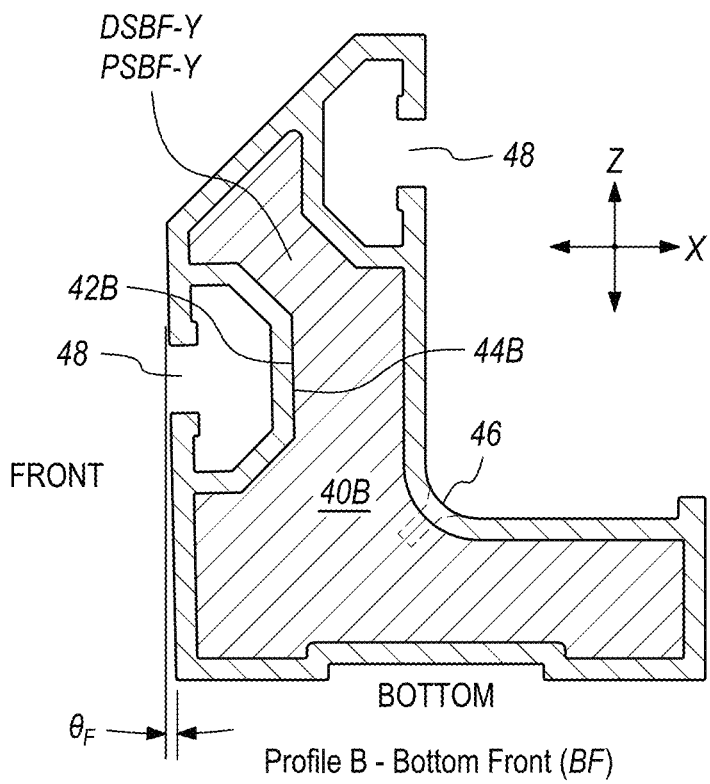
Figure 6C:
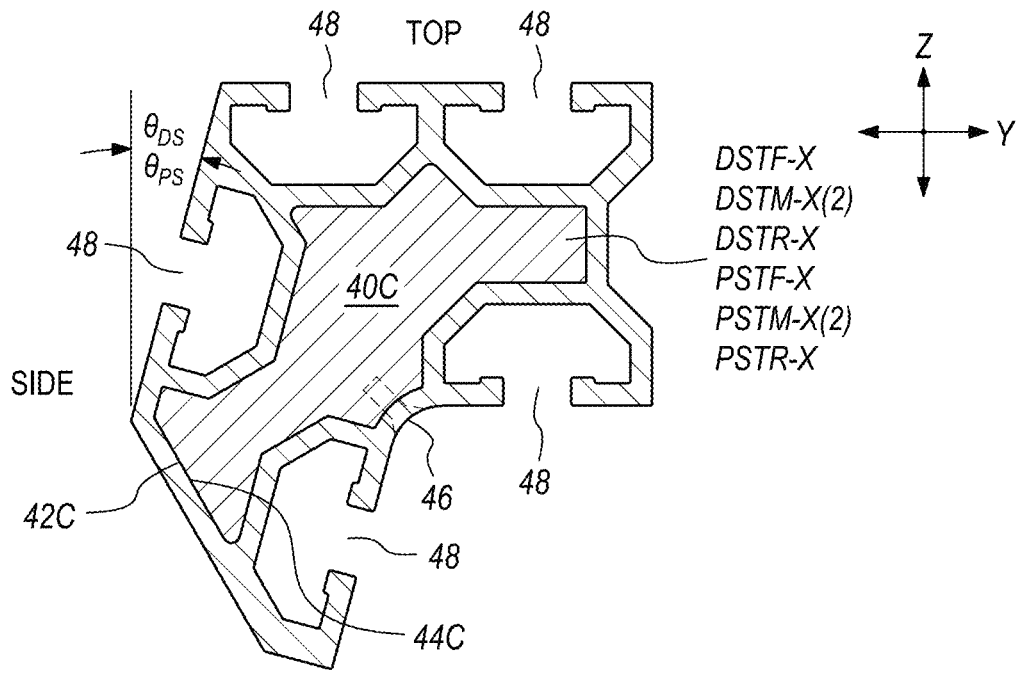
Figure 6D:
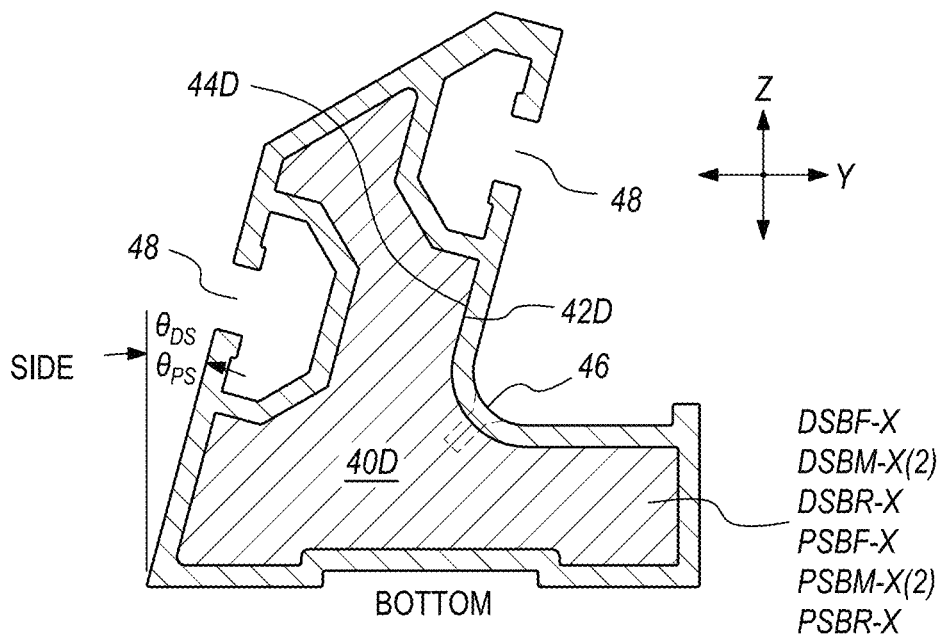
Figure 6E:
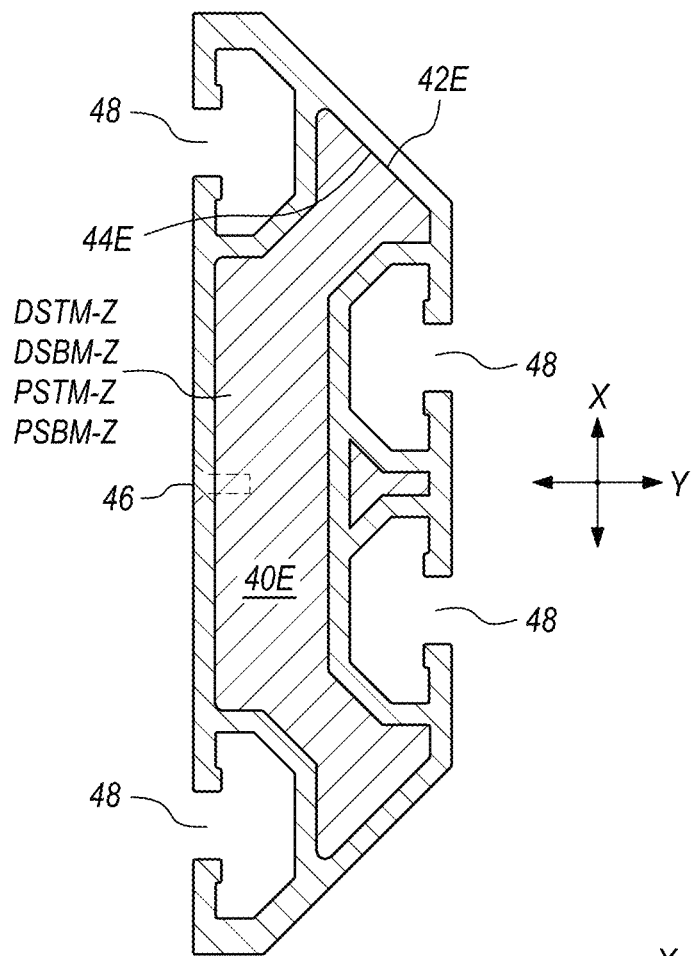
Figure 6F:
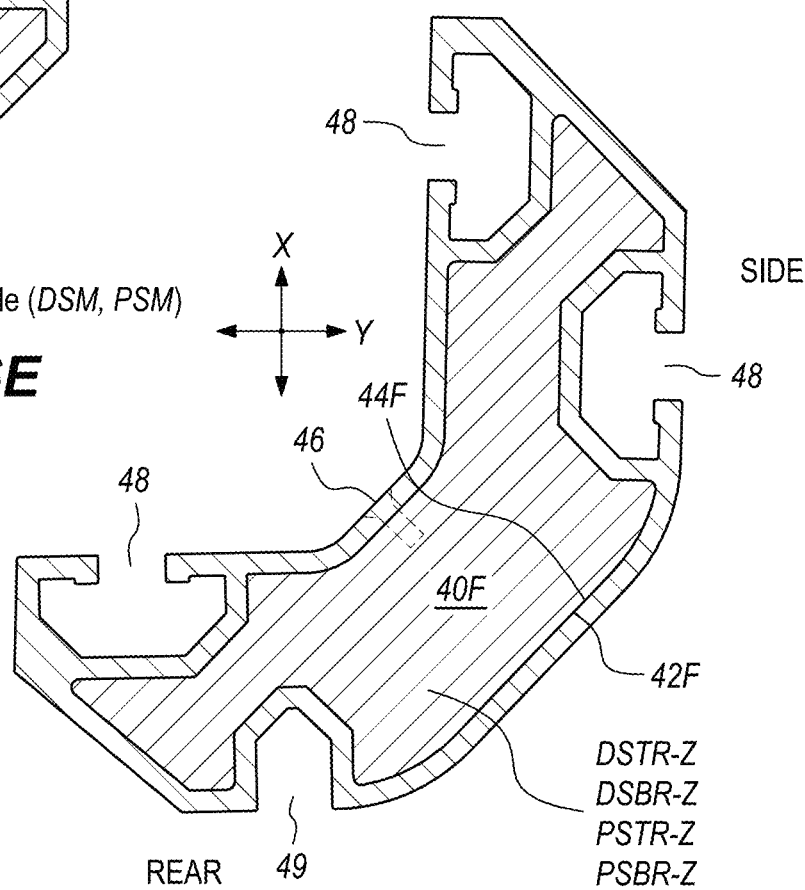
Figure 6G:
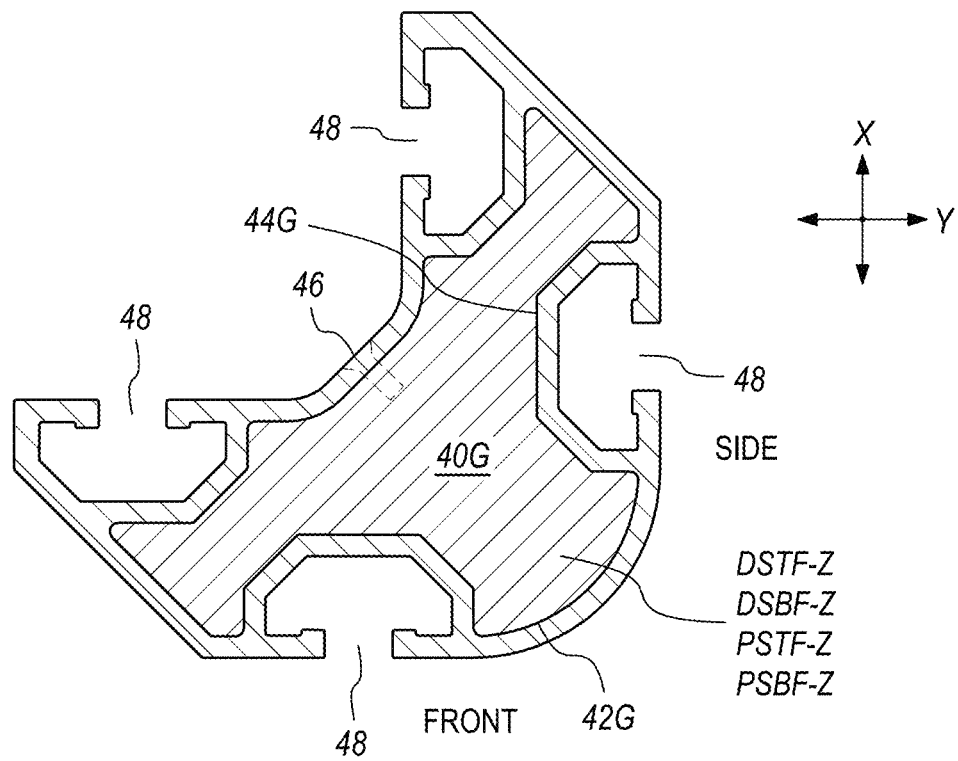
Figure 6H:
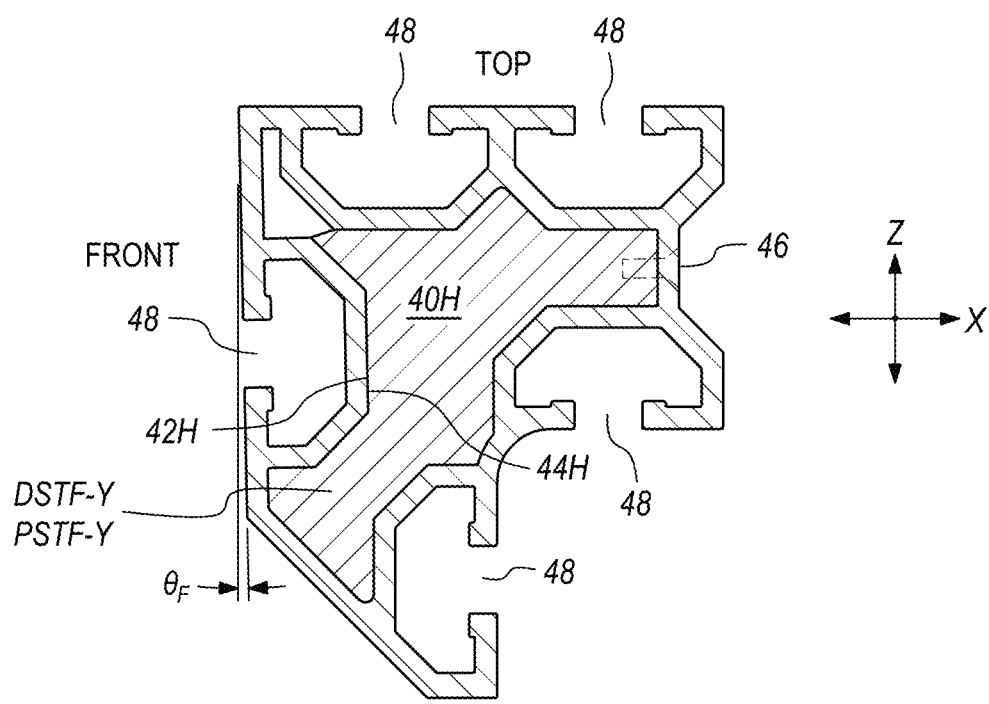

FIGS. 6A-H are cross-sectional views of certain connections between a coupling connector and a rail having a given profile. In each Figure, the linear connector 40A-H forms a solid body having an exterior cross-sectional shape or surface 42A-H that is the complement of the interior cross-sectional shape of a central tube 44A-H formed by the rail. With the connection formed as shown, the walls of the central tube 44A-H circumscribe the linear connector 40A-H. A set screw 46 may extend through a hole in the central tube of the rail and into the linear connector to prevent axial movement or disconnection. Each Figure identifies the rail profile and the rails that use that rail profile, as well as the couplings and the linear connector directions that may connect with the identified rails. For example, FIG. 6A shows the rail Profile A used only by the top rear (TR) rail, which connects with linear connectors DSTR-Y (i.e., the Y-directed linear connector of the DSTR coupling) and PSTR-Y (i.e., the Y-directed linear connector of the PSTR coupling). Similar information is noted in each of FIGS. 6A-H. Each Figure also provides some orientation information and identifies the side angles affecting each rail profile. Each Figure also illustrates the positions of the T-slots 48 on each rail. In the illustrated embodiment, the rails may have from 2 to 5 T-slots depending upon their position in the rack.

FIGS. 7A-B are perspective views of a corner coupling 50 and an in-line coupling 60, respectively. The corner coupling 50 in the example of FIG. 7A is the PSFB (Passenger Side Front Bottom) corner coupling. The PSFB coupling 50 has an X-direction linear connector with Profile D, a Y-direction linear connector with Profile B, and a Z-direction linear connector with Profile G that is tilted forward at angle $\Theta_F$ and angled inward from the passenger side at angle $\Theta_{PS}$. Each of the three linear connectors extends along its respective axis from the rigid body 52. The rigid body 52 forms a shoulder 54 around each linear connector as well as the recessed surfaces 28. From the present perspective view, the Y-direction linear connector and the Z-direction linear connector show an exterior surface 56 that is indented to complement the interior profile of a central tube having a T-slot that aligns with the surface 56. In order to avoid blocking the ends of these T-slots in the rails, the shoulders 54 adjacent the surface 56 (see the shoulders at points 58) are no wider than that thickness of the central tube wall. Once connected as shown in FIGS. 1-2, the T-slot will be flush with the coupling to allow water drainage out of the T-slot and to allow the head of a T-slot fastener to be slid into the open end of the T-slot.

FIG. 7B illustrates the DSBM (Driver Side Bottom Middle) inline coupling. The DSBM coupling 60 has two X-direction linear connectors with Profile D and one Z-direction linear connector with Profile E that angles forward at angle $\Theta_R$ and angles inward from the driver side at angle $\Theta_{DS}$. Each of the three linear connectors extends along its respective axis from the rigid body 52 and the rigid body 52 forms a shoulder 54 around each linear connector as well as the recessed surface 28. From the present perspective view, the linear connectors show an exterior surface 56 that is indented to complement the interior profile of a central tube having a T-slot that aligns with the surface 56. In order to avoid blocking the ends of these T-slots in the rails, the shoulders 54 adjacent the surface 56 (see the shoulders at points 58) are no wider than that thickness of the central tube wall. Once connected as shown in FIGS. 1-2, the T-slot will be flush with the recessed coupling surface 28 to allow water drainage out of the T-slot and to allow the head of a T-slot fastener to be slid into the open end of the T-slot.

Figure 7C:
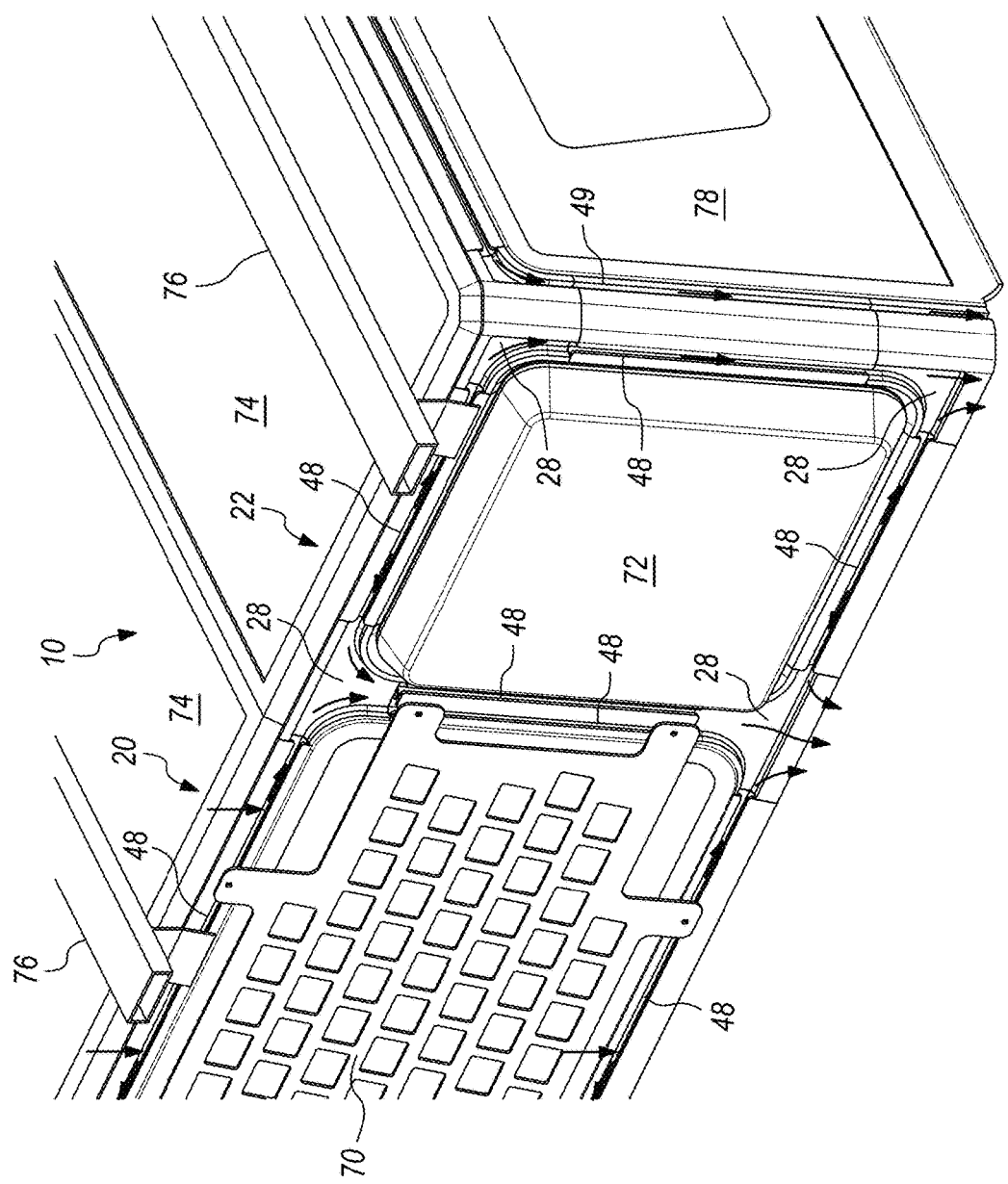
FIG. 7C is a perspective view of the rack illustrating how water is allowed to drain from T-slots in the exterior sides of the rack.

FIG. 7C is a perspective view of the rack 10 illustrating how water is allowed to drain (see the arrows indicating the direction of water drainage) from the outward facing T-slots in the sides of the rack. This water drainage is possible despite multiple accessories being connected to the T-slots. For example, a cargo mounting panel 70 is secured to the driver side front frame 20, a window unit 72 is secured to the driver side back frame 22, roof panels 74 are secured to the upwardly directed T-slots in the top rails forming the top frame, cargo rails 76 are secured to the laterally directed T-slots of the top rails, and a tailgate 78 is secured to the rear frame. A slot 49 (other than a T-slot; see also FIG. 6F) may be dedicated to water drainage.

Figure 8:
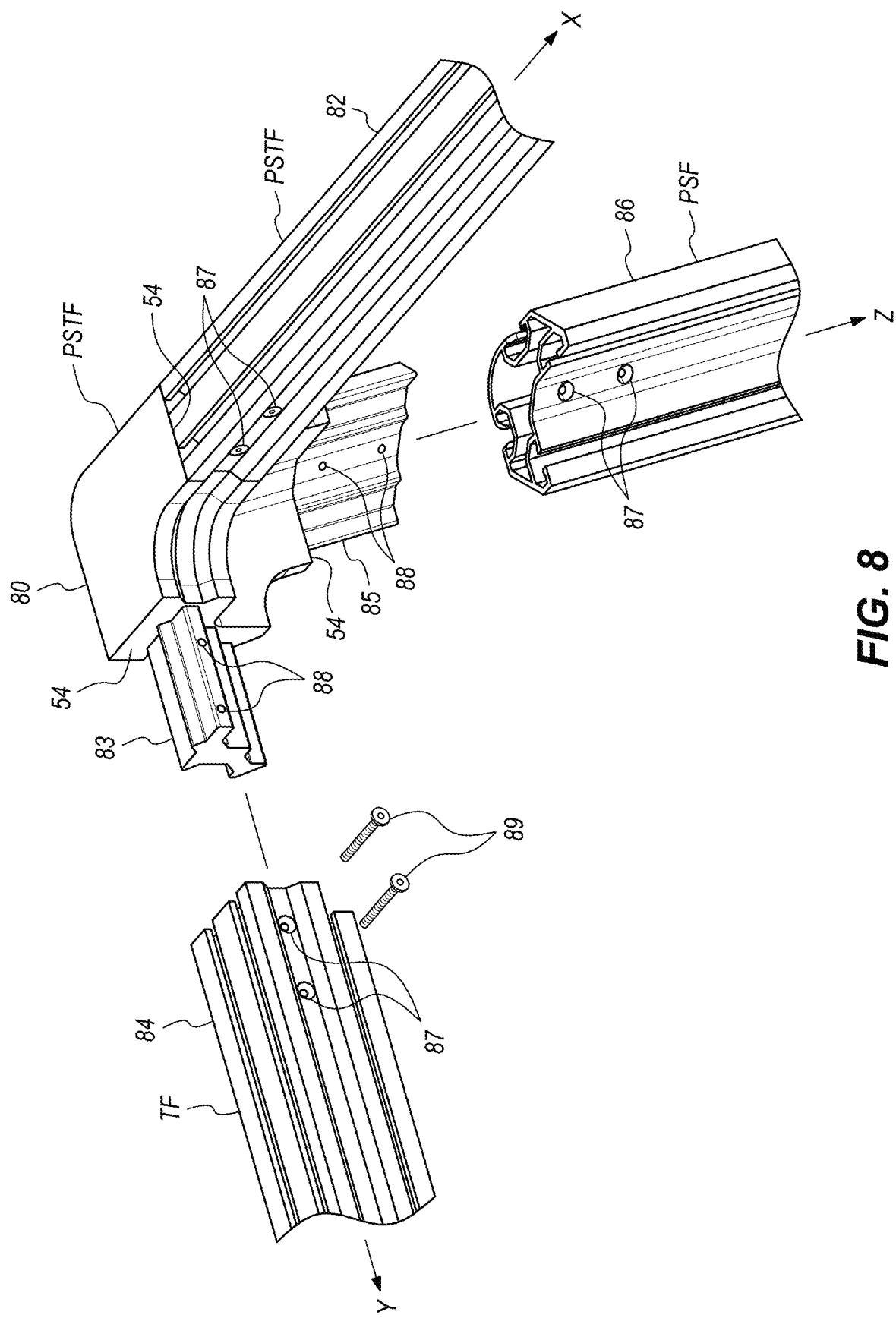
FIG. 8 is a perspective view of a corner coupling having a first linear connector that is already connected to a rail and second and third linear connectors aligned for connecting with second and third rails.

FIG. 8 is perspective view of a corner coupling (PSTF) 80 having a first (X-direction) linear connector that is already connected to a rail (PSTF) 82, a second (Y-direction) linear connector 83 aligned for connecting with a second (TF) rail 84 and a third (Z-direction) linear connector 85 aligned for connecting with a third (PSF) rail 86. The rails have prepared holes 87 and the linear connectors have prepared holes 88 for receiving set screws 89 after the rails are received about the linear connectors. Specifically, the ends of the rails 82, 84, 86 should slide over the linear connectors until the ends of the rails abut the shoulders 54 and the holes 87 in the rails become aligned with the holes 88 in the linear connectors. The set screws 89 are then secured into the aligned holes to prevent the rail from separating from the linear connector.

Figures 9A, 9B:
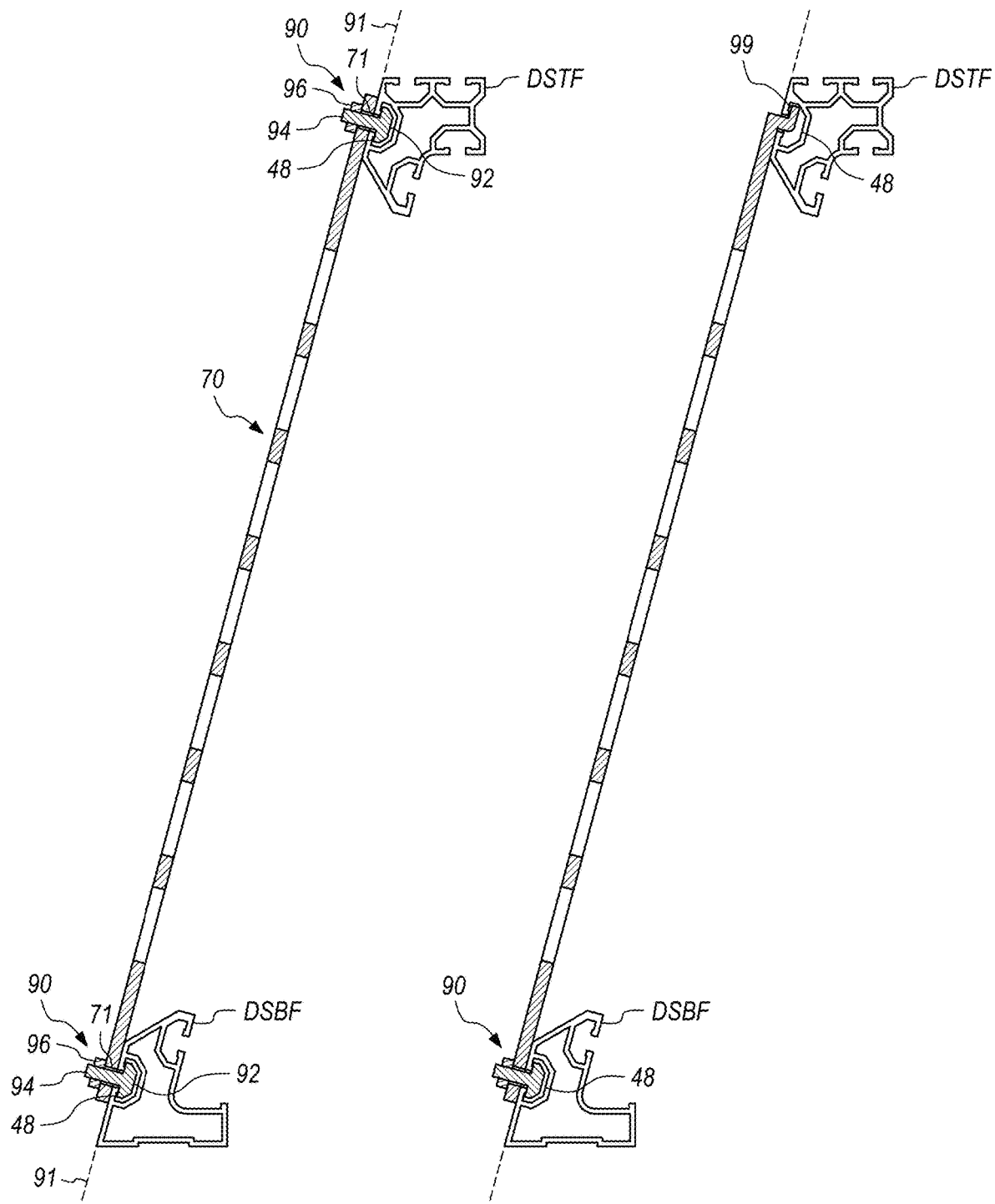
FIGS. 9A-B is a cross-sectional view of an accessory secured between a T-slot in a top side rail and a T-slot in a bottom side rail using T-slot fasteners alone or in combination with an angle bracket.

FIGS. 9A-B are cross-sectional views of an accessory secured between a T-slot 48 in an outward directed, top side rail DSTF and an outward directed T-slot 48 in a bottom side rail DSBF using two T-slot fasteners 90 (FIG. 9A) or one T-slot fastener 90 and an angle bracket (FIG. 9B). The DSTF and DSBF rails form part of a Driver Side Front frame and dispose the two T-slots 48 in a plane 91. The top and bottom ends of the panel 70 are secured to a corresponding T-slot 48 by positioning the flange 92 of a T-slot fastener 90 into the T-slot 48 leaving the threaded shaft 94 extending from the T-slot. The shaft 94 may be directed through a hole 71 in the panel 70 before a threaded nut 96 is threaded onto the shaft 94. Accordingly, the panel 70 can be tightly secured to the rails. In FIG. 9B, the panel 70 is similarly secured at the bottom rail, but an angle bracket 99 is inserted into the T-slot 48 in the upper rail before securing the bottom end of the panel 70 to the bottom rail.

Figure 9C:
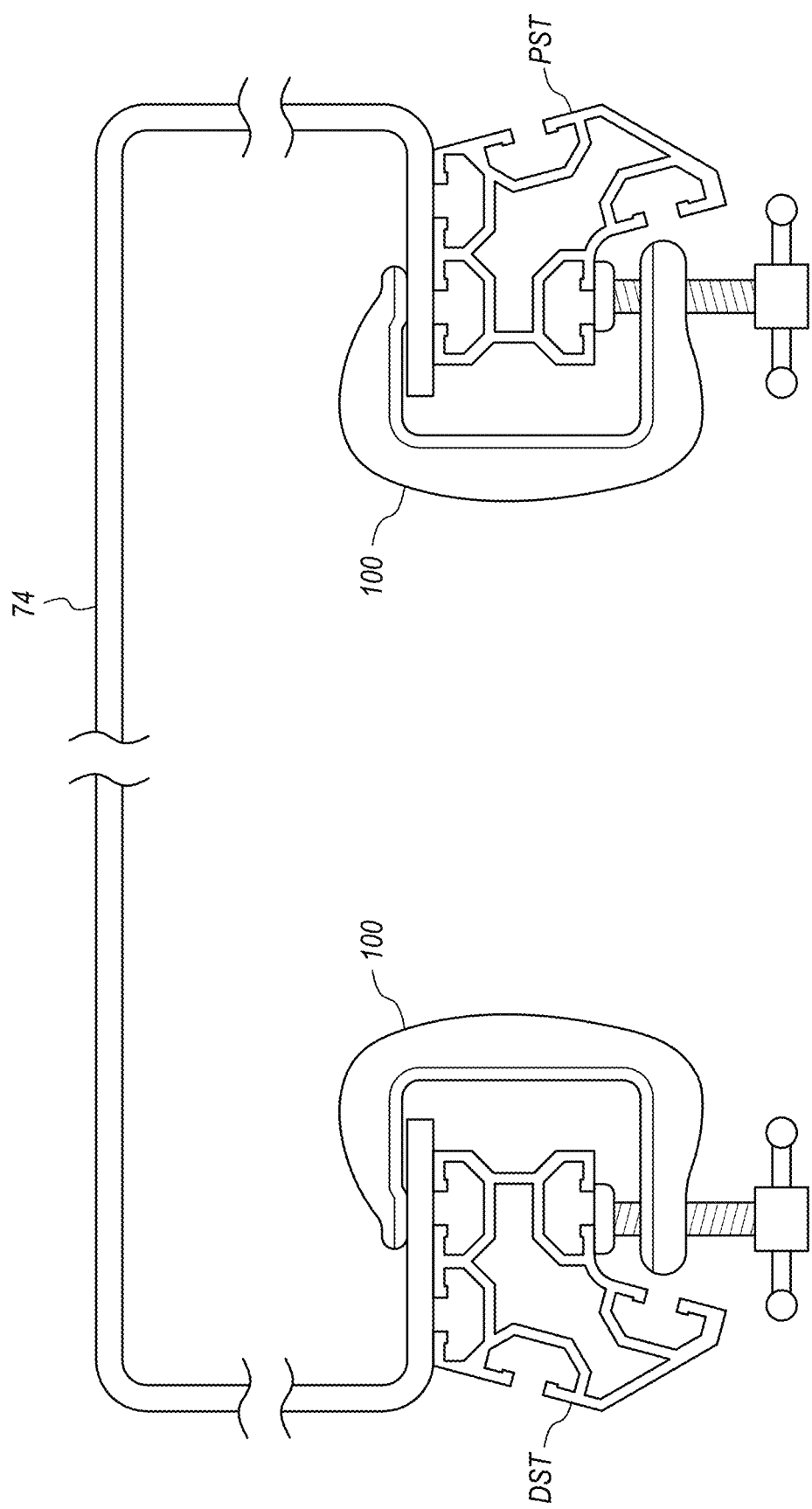
FIG. 9C is a cross-sectional view of an accessory secured between a driver side top rail and a passenger side top rail using C-clamps.
Figure 9D:
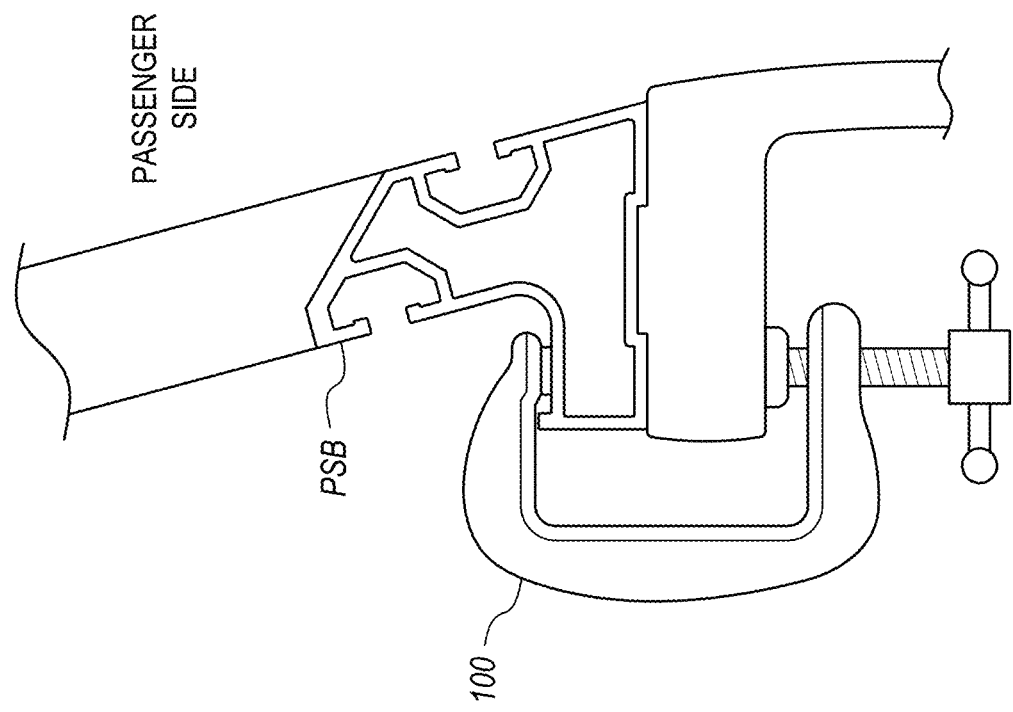
FIG. 9D is a cross-sectional view of the rack secured to the cargo bed side walls.
Figure 9D:
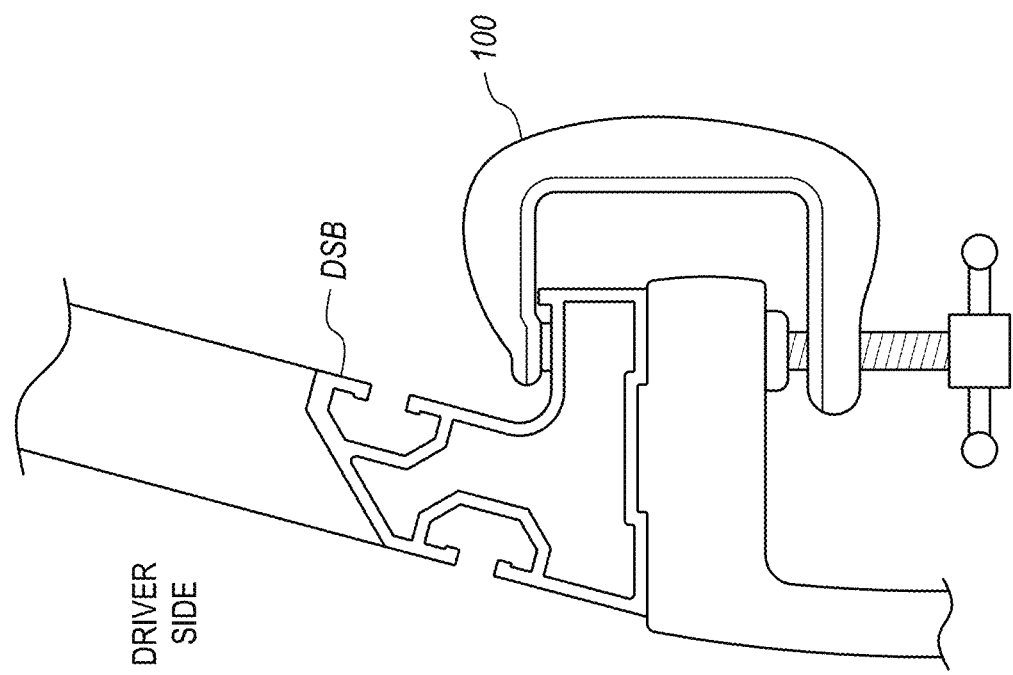

FIG. 9C is a cross-sectional view of an accessory, such as a roof panel 74, secured between a driver side top (DST) rail and a passenger side top (PST) rail using C-clamps 100. Other clamp styles may be used. Any number and arrangement of clamps may be used to secured the accessory.

FIG. 9D is a cross-sectional view of the rack secured to the cargo bed side walls 16. Specifically, the driver side bottom (DSB) rail and the passenger side bottom (PSB) rail are each secured to one of the cargo bed side walls 16 using C-clamps 100. Other clamp styles may be used. Any number and arrangement of clamps may be used to secured the rack.

FIGS. 10A-B, FIGS. 11A-B and FIGS. 12A-B illustrate various non-limiting configurations of accessories that may be secured to the rack 10. As can be seen, the rack 10 may be customized to include a combination of accessories that a user has selected to achieve some purpose.

Figure 10A:
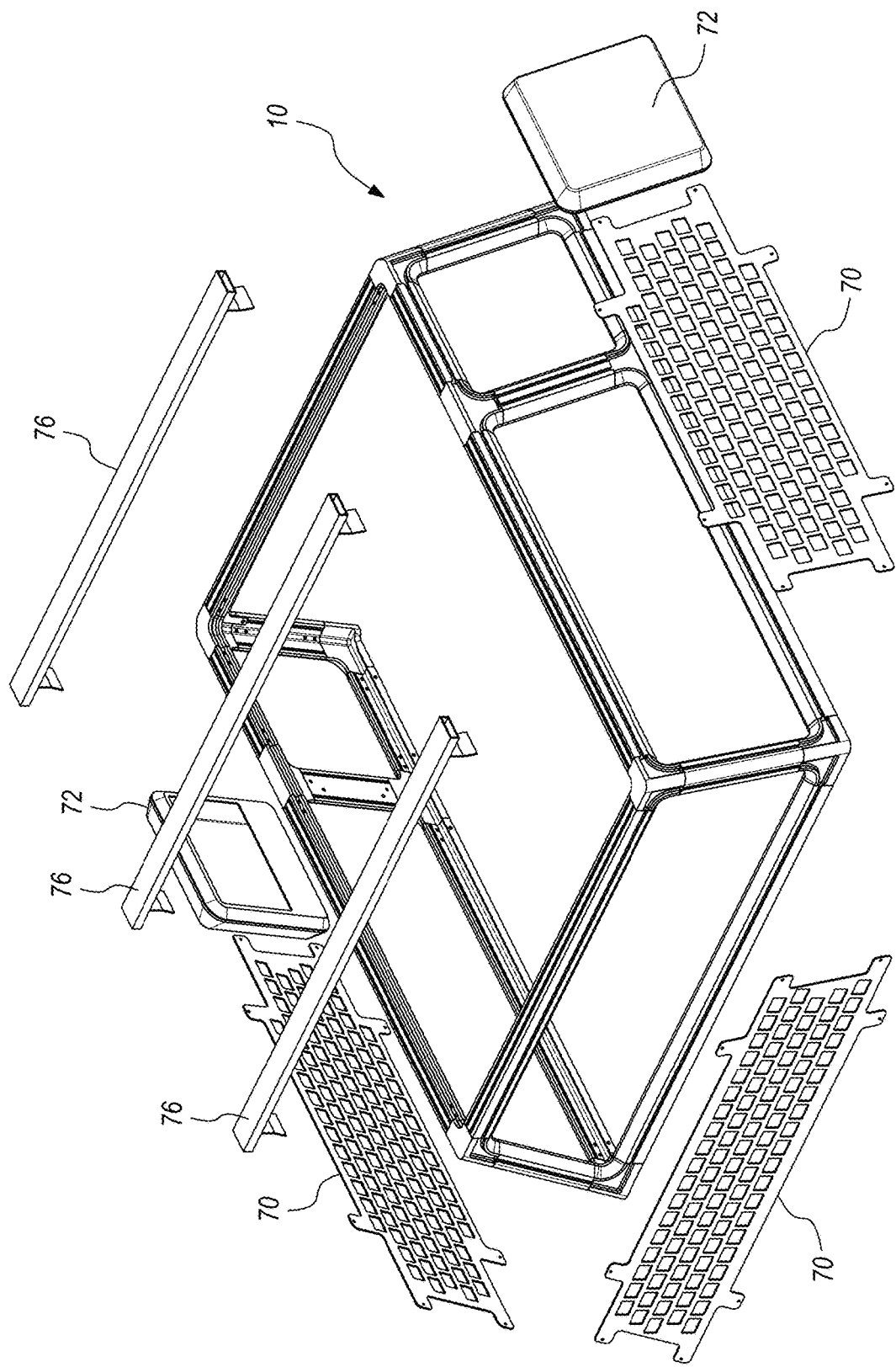
FIGS. 10A-B are perspective views of Molle panels, top racks, and a window panel before and after securing to the rack.
Figure 10B:
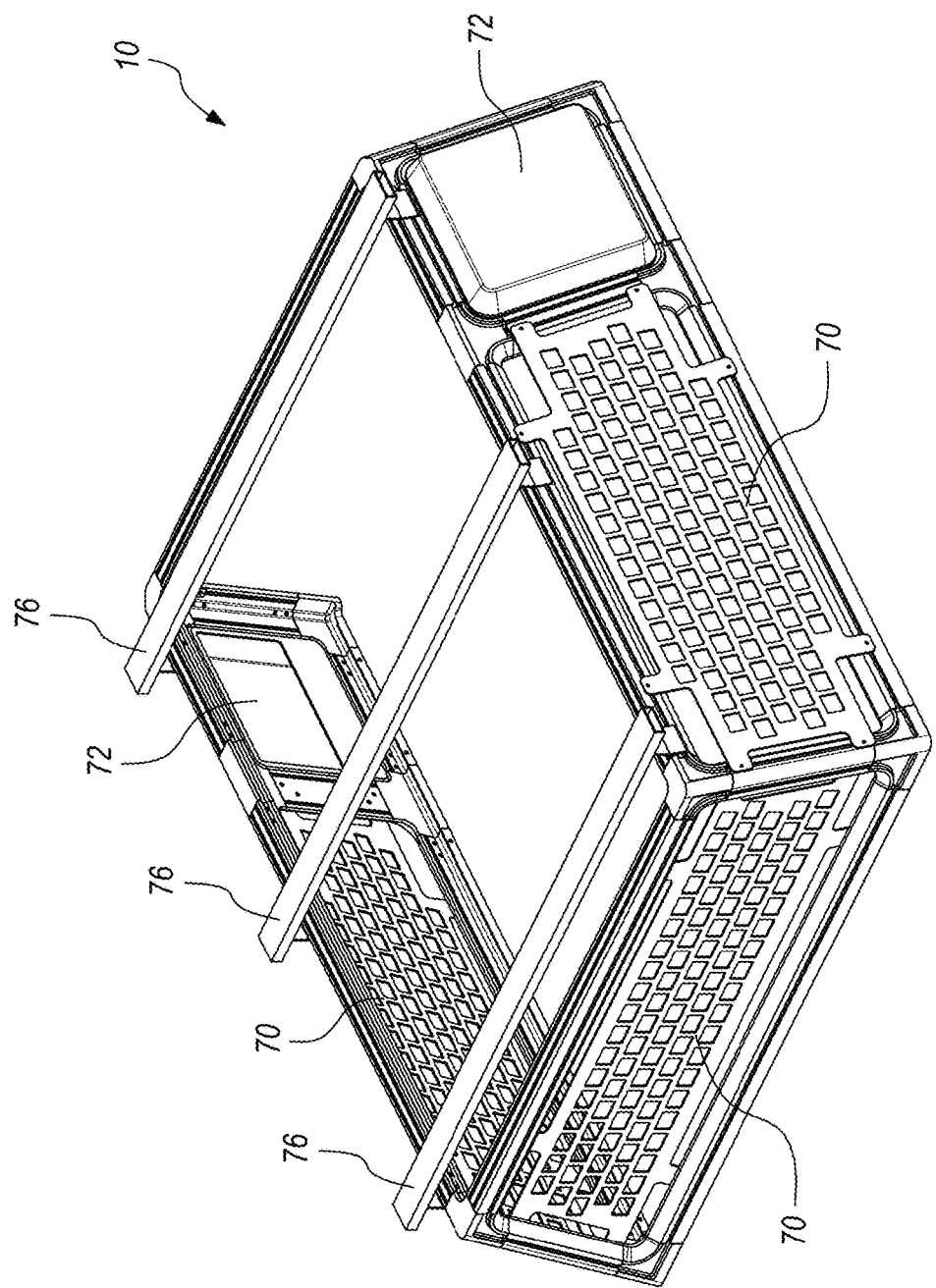

FIGS. 10A-B are perspective views of cargo mounting panels 70, top racks 76, and window panels 72 before and after securing to the rack 10. Optionally, the cargo mounting panels 70, which may be Molle panels, may be secured to either the outside of the rack (as shown) using outward directed T-slots or to the inside of the rack using inward directed T-slots. The cargo mounting panels 70 are shown being secured with 8 T slot fasteners per panel.

Figure 11A:
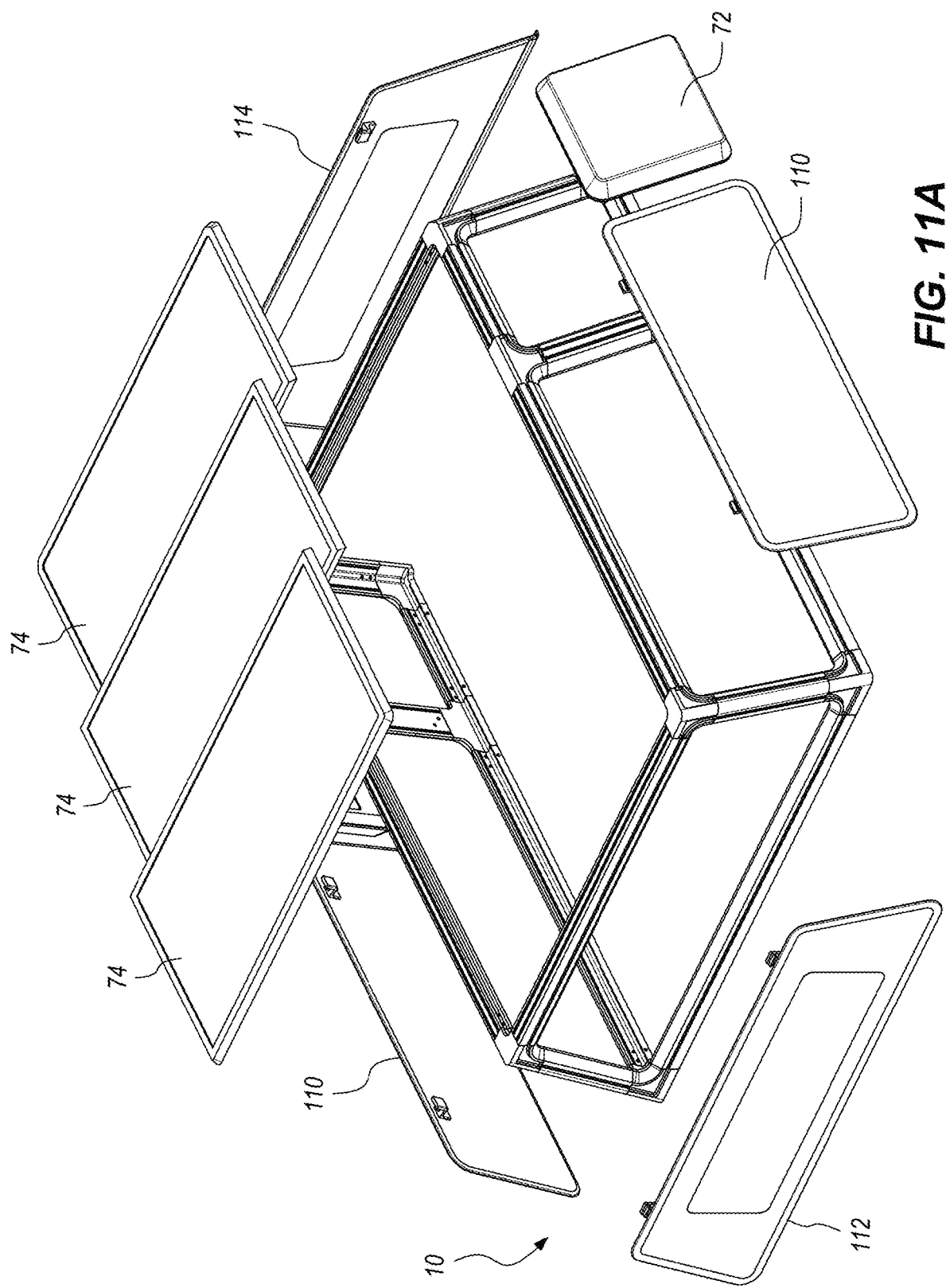

FIGS. 11A-B are perspective views of front side window panels 110, rear side window panels 72, a front window panel 112, rear hatch/door panel 114, and three roof panels 74 before and after securing to the rack 10. This configuration of accessories utilizes the rack 10 to form a fully enclosed truck cap (see FIG. 11B). The roof panels 74 may be secured either with T-slot fasteners or clamps.

Figure 12A:
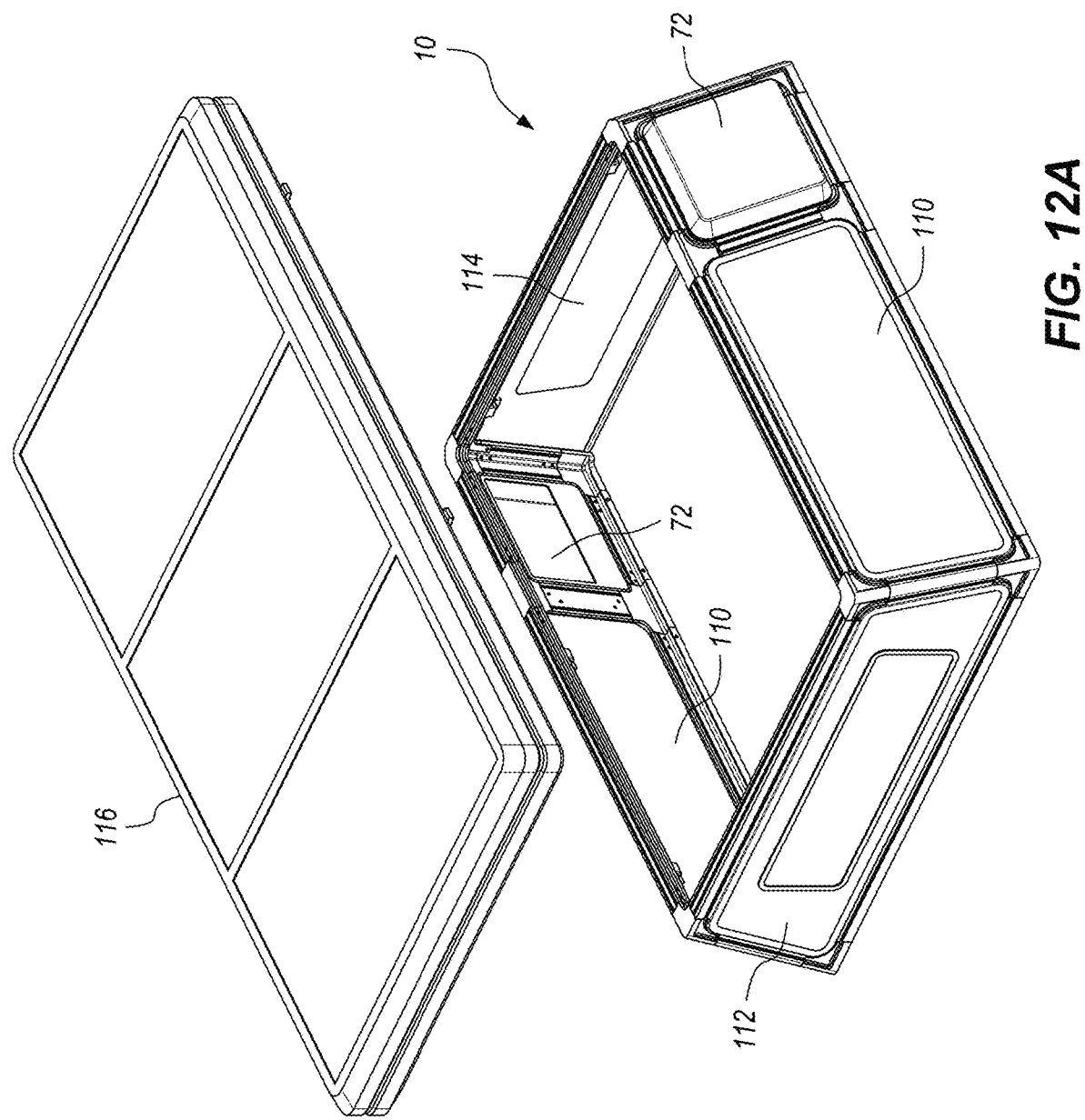
FIGS. 12A-B are perspective views of a pop-up camper unit before securing to the top of the rack, after securing to the top of the rack, and after expanding the pop-up camper unit.
Figure 12B:
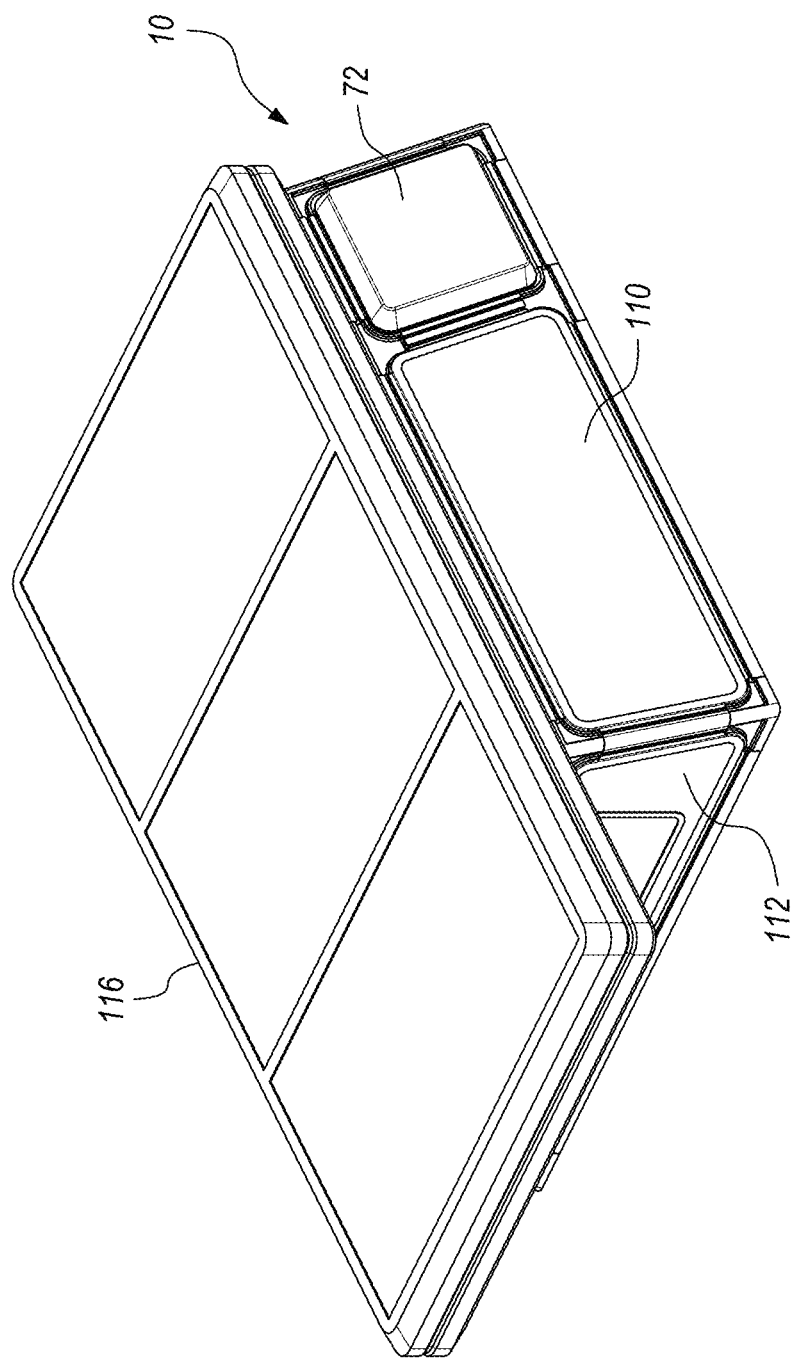
Figure 12C:
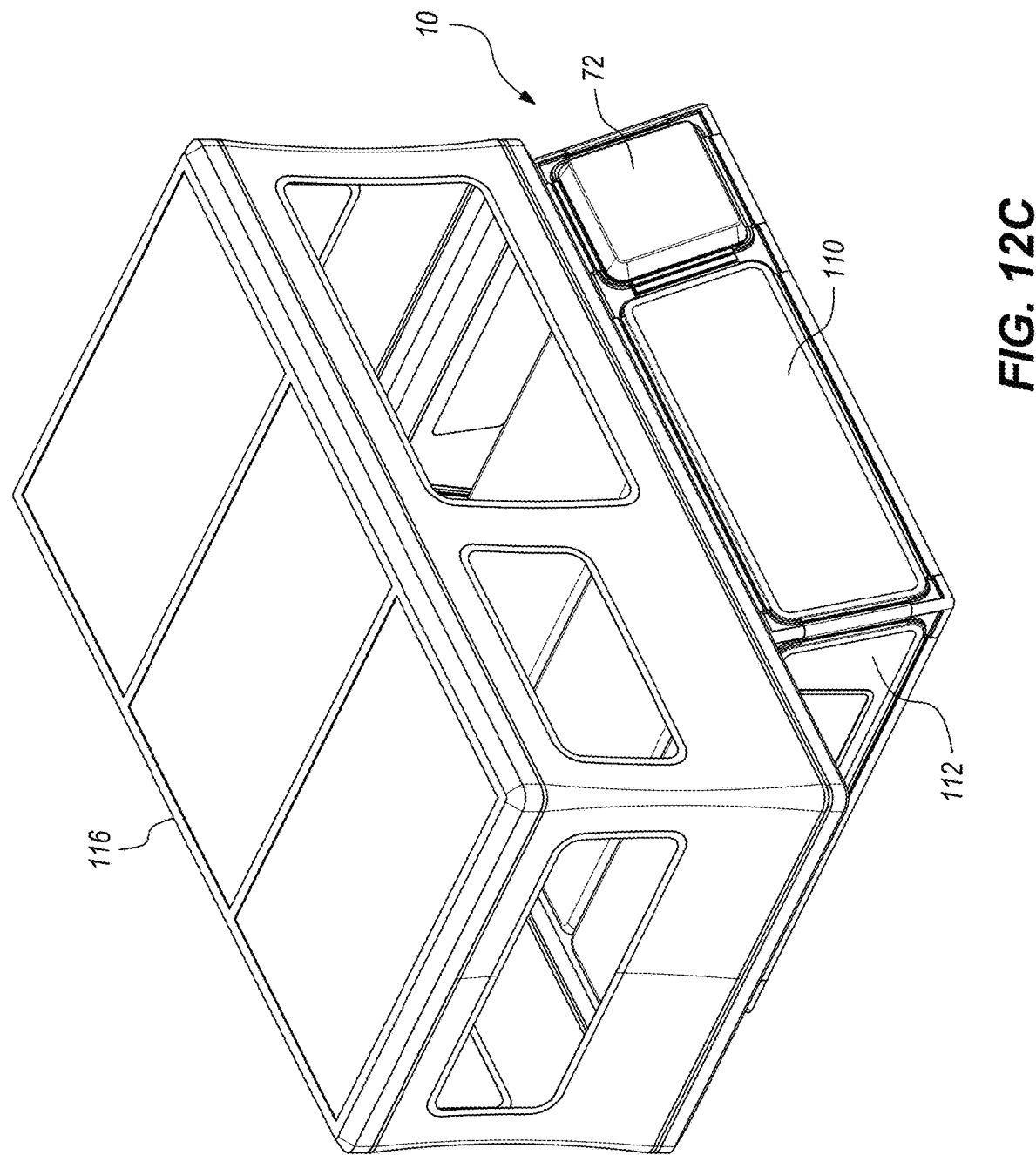
FIG. 12C shows the pop-up camper unit in an expanded configuration for use at a campsite or other location.

FIGS. 12A-C are perspective views of a pop-up camper unit 116 before securing to the top of the rack (FIG. 12A), after securing to the top of the rack (FIG. 12B), and after expanding the pop-up camper unit (FIG. 12C). The pop-up camper unit 116 may be set directly on top of the rack 10 and secured using C clamps and/or T slot fasteners. FIG. 12B shows the pop-up camper unit 116 in a secured configuration as would be used as the truck is being driven. FIG. 12C shows the pop-up camper unit 116 in an expanded configuration for use at a campsite or other location.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A rack for a truck bed, comprising:
    a structural framework formed by a set of linear rails and a set of couplings, wherein each linear rail has a first end connected to one of the couplings and a second end connected to another of the couplings, and wherein the linear rails and the couplings are connected to form a driver side frame, a front frame, a passenger side frame, a rear frame and a top frame;
    wherein each linear rail has a uniform cross-sectional profile along its length, and wherein the uniform cross-sectional profile has an outer profile that forms an outwardly directed T-slot and a central tube having an interior profile that is a complex shape; and
    wherein each coupling includes a rigid body and a plurality of linear connectors extending from the rigid body, wherein, for each of the linear connectors, the linear connector has an exterior profile that is a complement to and slidably received within the interior profile of the linear rail to which the linear connector is connected, and wherein the central tube circumscribes the exterior profile of the linear connector.

2. The rack of claim 1, wherein the driver side frame, front frame, passenger side frame and top frame have linear rails on four sides, and wherein the rear frame has rails on only three sides.

3. The rack of claim 1, wherein each linear rail has at least one outward-facing T-slot and at least one inward-facing T-slot.

4. The rack of claim 1, where each linear rail is formed by an extrusion process that gives the linear rails a uniform cross-sectional profile.

5. The rack of claim 1, wherein the set of couplings includes corner couplings and inline couplings.

6. The rack of claim 1, wherein the linear rails and couplings are connected to form two driver side frames and two passenger side frames, wherein the two driver side frames are coplanar, connected by two driver side inline couplings and share a first upward directed middle rail connected between the two driver side inline couplings, and wherein the two passenger side frames are coplanar, connected by two passenger side inline couplings and share a second upward direct middle rail connected between the two passenger side inline couplings.

7. The rack of claim 1, wherein the end of the linear rail is secured to the linear connector of the coupling with one or more set screws, wherein the one or more set screws pass through a side of the linear rail and then into the linear connector.

8. The rack of claim 1, wherein the rigid body of each coupling includes a shoulder around each linear connector that seats against the first or second end of a corresponding linear rail.

9. The rack of claim 8, wherein the shoulder has a profile that avoids blocking a first or second end of the outwardly directed T-slot.

10. The rack of claim 1, wherein the driver side frame, the front frame and the passenger side frame each include a bottom rail, and wherein the bottom rail of each frame has a bottom surface that lies in a common plane.

11. The rack of claim 1, wherein the driver side frame and the passenger side frame are angled inward at a first angle, the rear frame is angled forward at a second angle and the front frame is angled forward at a third angle.

12. The rack of claim 11, wherein the linear rails and couplings are connected to form two driver side frames and two passenger side frames, wherein the two driver side frames are coplanar, connected by two driver side inline couplings and share a first upward directed middle rail connected between the two driver side inline couplings, wherein the two passenger side frames are coplanar, connected by two passenger side inline couplings and share a second upward direct middle rail connected between the two passenger side inline couplings, and wherein the first and second upward directed middle rails are angled forward at the second angle.

13. The rack of claim 1, wherein the outwardly directed T-slot in each of the linear rails that form the driver side frame lie in a first plane, and wherein the outwardly directed T-slot in each of the linear rails that form the passenger side frame lie in a second plane.

14. The rack of claim 1, further comprising:
    an accessory secured to the T-slots of two opposing linear rails of one of the frames by at least two T-slot fasteners.

15. The rack of claim 14, wherein the accessory is a rigid cargo mounting panel.

16. The rack of claim 1, wherein the linear rails are formed by extrusion of metal and the couplings are formed by injection molding of a polymeric material.

17. The rack of claim 1, wherein the driver side frame, the front frame, and the passenger side frame are each formed by two upward-directed rails and two lateral/longitudinal-directed rails, where any two adjacent frames share a rail, and wherein a plurality of shared rails have a first outwardly directed T-slot lying in a plane of the first frame and a second outwardly directed T-slot lying in a plane of the second frame.

18. The rack of claim 1, wherein a plurality of the couplings are corner couplings having three linear connectors with three different exterior profiles for connecting to three rails having three different interior profiles.

19. The rack of claim 18, wherein a first of the three linear connectors is directed for connection with an upward directed rail, a second of the three linear connectors is directed for connection with a lateral directed rail, and a third of the three linear connectors is directed for connection with a longitudinal directed rail.

20. The rack of claim 1, wherein the driver side frame, the front frame, the passenger side frame, and the rear frame have a top rail that is shared with the top frame, and wherein each of the top rails includes two or more side-by-side, upward facing T-slots.

21. A kit, comprising:
a set of linear rails, wherein each linear rail has a uniform cross-sectional profile along its length, wherein the uniform cross-sectional profile has an outer profile that forms an outwardly directed T-slot and a central tube having an interior profile that is a complex shape;
a set of couplings, wherein each coupling includes a rigid body and a plurality of linear connectors extending from the rigid body, wherein, for each of the linear connectors, the linear connector has an exterior profile that is a complement to and slidably receivable within the interior profile of one of the linear rails to which the linear connector is to be connected, wherein the central tube circumscribes the exterior profile of the linear connector when the linear connector is inserted into the central tube, and wherein the set of linear rails and the set of couplings are adapted to form a structural framework with each linear rail having a first end connected to one of the couplings and a second end connected to another of the couplings, and wherein the linear rails and the couplings are connectable to form a driver side frame, a front frame, a passenger side frame, a rear frame and a top frame.

22. The kit of claim 21, further comprising:
a plurality of set screws, each set screw for securing a connection between one of the linear connectors and an end of one of the linear rails.

23. The kit of claim 21, further comprising:
a plurality of T-slot fasteners; and
one or more accessories, wherein each accessory is securable to the outwardly directed T-slot of one or more of the linear rails using one or more of the T-slot fasteners.

24. The kit of claim 23, wherein the one or more accessories are selected from a cargo mounting plate, a window, a door, and a roof panel.

25. The rack of claim 1, wherein each coupling is a rigid polymeric coupling that forms the rigid body and the plurality of linear connectors.

26. The rack of claim 25, wherein the complex shape of the interior profile in the central tube of the linear rails and exterior profile of the linear connectors that is a complement to the interior profile prevent rotation between the linear rails and the linear connectors.

27. The rack of claim 25, wherein each linear connector is from 1.5 to 4 inches long and limits angular deflection between the linear connector and the linear rail.

28. The rack of claim 25, wherein each of the linear connectors is secured within the first end or the second of one of the linear rails with one or more set screws having a distal end that passes through a side of the linear rail and then into the linear connector.

29. The rack of claim 1, wherein the central tube is a single central tube that has greater cross-sectional area than any other tube in the linear rail.

30. The rack of claim 11, wherein the plurality of linear rails include linear rails having from seven to eight different cross-sectional profiles, and wherein the plurality of couplings include couplings having from eight to twelve unique couplings.

31. The rack of claim 1, wherein the plurality of couplings are configured so that water emptying from a top rail is guided to flow downward into and through a T-slot in an upward directed linear rail that is connected to the same coupling.

* * * * *